United States Patent
Chae et al.

(10) Patent No.: US 10,801,152 B2
(45) Date of Patent: Oct. 13, 2020

(54) CLOTHES PROCESSING DEVICE

(71) Applicant: LG ELECTRONICS INC., Seoul (KR)

(72) Inventors: Aekyung Chae, Seoul (KR); Jaehyun Kim, Seoul (KR); Hyundong Kim, Seoul (KR); Junghwan Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 269 days.

(21) Appl. No.: 15/749,958

(22) PCT Filed: Jul. 29, 2016

(86) PCT No.: PCT/KR2016/008398
§ 371 (c)(1),
(2) Date: Feb. 2, 2018

(87) PCT Pub. No.: WO2017/023046
PCT Pub. Date: Feb. 9, 2017

(65) Prior Publication Data
US 2018/0223465 A1 Aug. 9, 2018

(30) Foreign Application Priority Data

Aug. 3, 2015 (KR) .................. 10-2015-0109620
Aug. 3, 2015 (KR) .................. 10-2015-0109621

(51) Int. Cl.
*D06F 37/20* (2006.01)
*D06F 37/22* (2006.01)
(Continued)

(52) U.S. Cl.
CPC .......... *D06F 37/225* (2013.01); *D06F 33/00* (2013.01); *D06F 37/203* (2013.01); *F16F 15/32* (2013.01);
(Continued)

(58) Field of Classification Search
None
See application file for complete search history.

(56) References Cited

U.S. PATENT DOCUMENTS

2012/0192362 A1* 8/2012 Lee ............... D06F 37/203 8/137
2013/0025331 A1* 1/2013 Kim ............... D06F 37/225 68/140
(Continued)

FOREIGN PATENT DOCUMENTS

EP 2 603 628 6/2013
JP 2005-021505 1/2005
(Continued)

OTHER PUBLICATIONS

Espacenet translation. KR 10-2013-0114478 A, Washing machine capable of actively moving a balancing unit (Year: 2013).*
(Continued)

*Primary Examiner* — Cristi J Tate-Sims
(74) *Attorney, Agent, or Firm* — Ked & Associates, LLP

(57) ABSTRACT

A clothes processing device comprising: a cabinet; a tub which is provided inside the cabinet and stores washing water therein; a drum which is rotatably provided inside the tub and stores clothes therein; a housing fixed to the drum; an accommodation space which is provided inside the housing and forms a closed curve; a balancing unit which is provided to be movable inside the accommodation space so as to solve an unbalanced state of the drum; a ring connected to the balancing unit in order to move the balancing unit; and an operation part for moving the ring, wherein the balancing unit is rotatable by 360 degrees along the accommodation space.

26 Claims, 17 Drawing Sheets

(51) Int. Cl.
  *D06F 33/00* (2020.01)
  *F16F 15/32* (2006.01)
  *D06F 37/24* (2006.01)
  *D06F 37/04* (2006.01)
(52) U.S. Cl.
  CPC ............ *D06F 37/04* (2013.01); *D06F 37/245* (2013.01); *D06F 2222/00* (2013.01)

(56) References Cited

U.S. PATENT DOCUMENTS

| | | | | |
|---|---|---|---|---|
| 2013/0133475 | A1* | 5/2013 | Zelic | D06F 37/225 74/572.4 |
| 2013/0327098 | A1* | 12/2013 | Bae | D06F 37/203 68/13 R |
| 2013/0327099 | A1* | 12/2013 | Bae | F16F 7/1011 68/13 R |
| 2015/0354123 | A1* | 12/2015 | Kim | D06F 37/225 68/12.06 |
| 2016/0348295 | A1* | 12/2016 | Bae | D06F 37/203 |

FOREIGN PATENT DOCUMENTS

| | | |
|---|---|---|
| KR | 10-2004-0000865 | 1/2004 |
| KR | 10-2011-0010945 | 2/2011 |
| KR | 10-2013-0013061 | 2/2013 |
| KR | 10-2013-0114478 | 10/2013 |
| KR | 10-2013-0137513 | 12/2013 |

OTHER PUBLICATIONS

Espacenet translation. KR 10-2004-0000865, Device for detecting unbalance of washing machine (Year: 2004).*
International Search Report (with English Translation) and Written Opinion dated Nov. 7, 2016 issued in Application No. PCT/KR2016/008398.
European Search Report dated Mar. 7, 2019 issued in EP Application No. 16833282.3.

* cited by examiner (a)

(b)

(a)

(b)

(c)

(a)

(b)

CLOTHES PROCESSING DEVICE

CROSS-REFERENCE TO RELATED PATENT APPLICATIONS

This application is a U.S. National Stage Application under 35 U.S.C. § 371 of PCT Application No. PCT/KR2016/008398, filed Jul. 29, 2016, which claims priority to Korean Patent Application Nos. 10-2015-0109620 and 10-2015-0109621, both filed Aug. 3, 2015, whose entire disclosures are hereby incorporated by reference.

TECHNICAL FIELD

The present invention relates to a laundry treatment apparatus, and more particularly to a laundry treatment apparatus including a balancer.

BACKGROUND ART

A conventional laundry treatment apparatus includes a cabinet defining the appearance of the apparatus, a tub installed in the cabinet, a drum rotatably installed in the tub to wash laundry, and a drive unit for rotating the drum. The drum may rotate without maintaining dynamic equilibrium (dynamic equilibrium balance) depending on the position of laundry disposed therein.

"Dynamic equilibrium" means the state in which an inertia moment generated in a drum becomes zero during the rotation of the drum. The inertia moment becomes zero when the mass of laundry is evenly distributed about the axis of rotation of the drum. Accordingly, dynamic equilibrium in a laundry treatment apparatus may be considered to be the state wherein distribution of mass around an axis of rotation of a drum falls within an allowable range during rotation of the drum, that is, the state in which the amplitude of vibration of the drum containing laundry therein falls within an allowable range.

Meanwhile, the state wherein the dynamic equilibrium in a laundry treatment apparatus is lost is referred to as an unbalanced state. The unbalanced state means that mass distribution of laundry about the axis of rotation of a drum departs from the allowable range, and thus the amplitude of vibration of the drum containing laundry exceeds the range that the laundry treatment apparatus can accommodate.

When a drum rotates in an unbalanced state, vibration is generated. The vibration of the drum is transmitted to a tub or a cabinet thus causing generation of noise. In some cases, the drum may be broken.

Among conventional laundry treatment apparatuses, there is an apparatus equipped with a balancer for resolving an unbalanced state of a drum. A balancer incorporated in conventional laundry treatment apparatuses is a ball balancer or a fluid balancer.

Although the above-mentioned unbalance control is useful in the state in which vibration is in a steady state, in which the amplitude of vibration of a drum falls within a predetermined range, transient vibration, to which the drum is subjected before vibration of the drum reaches the steady state, is somewhat increased, which is problematic.

Furthermore, because the ball or fluid in the conventional balancer is passively moved to resolve the unbalanced state due to rotation of the drum, there is a problem in that a lot of time is required to reach the balanced state.

DISCLOSURE

Technical Problem

An object of the present invention devised to solve the problem is to provide a laundry treatment apparatus capable of actively resolving an unbalanced state of a drum independently of rotation of the drum. Another object of the present invention is to provide a laundry treatment apparatus capable of performing precise control of position of a balancing unit provided at a drum.

Technical Solution

The object of the present invention can be achieved by providing a laundry treatment apparatus including a cabinet; a tub disposed in the cabinet so as to contain washing water; a drum rotatably disposed in the tub so as to contain laundry; a housing secured to the drum; a receiving space defined in the housing so as to form a closed loop; a balancing unit movably disposed in the receiving space so as to resolve an unbalanced state of the drum; a ring connected to the balancing unit so as to move the balancing unit; and an actuator for moving the ring, wherein the balancing unit is revolvable 360 degrees within the receiving space.

The ring may be configured to have a circular shape defining a closed loop or an arc shape defining an open loop. The ring may have a strength such that a shape of the ring is not deformed by load of the balancing unit. The balancing unit may include a first balancing unit and a second balancing unit, wherein the ring includes a first ring; and a second ring disposed below the first ring and having the same diameter as the first ring, and wherein the first balancing unit is connected to the first ring and the second balancing unit is connected to the second ring.

The balancing unit may include a first balancing unit and a second balancing unit, wherein the ring may include a first ring; and a second ring having a diameter different from that of the first ring, and wherein the first balancing unit is connected to the first ring and the second balancing unit is connected to the second ring. The ring may include a ring guide protrusion or a ring guide groove, and the receiving space includes a receiving-space groove or a receiving-space protrusion having a shape corresponding to a shape of the ring guide protrusion or the ring guide groove.

The actuator may include a rotating gear, and the ring may include gear teeth formed on a surface thereof, the gear teeth being engaged with the rotating gear so as to be moved. The actuator may include a rotating gear, and the ring may be composed of a chain, the chain being engaged with the rotating gear so as to be moved.

According to the present invention, the balancing unit may be configured to define an arc extending in a circumferential direction with respect to a central axis of the drum. The balancing unit may be connected to an outer circumferential surface of the ring. The balancing unit may come into contact with a surface of the receiving space, and is held thereat when a rotational speed of the drum is equal to or higher than a predetermined speed.

The present invention provides the laundry treatment apparatus that may further include rollers provided at opposite ends of the balancing unit so as to enable the balancing unit to be smoothly moved in the receiving space. The present invention provides the laundry treatment apparatus that may further include a spacer provided at the balancing unit or an inner side surface of the receiving space so as to space the balancing unit apart from a surface of the receiving space.

The present invention provides the laundry treatment apparatus that may further include a magnetic body provided at the balancing unit; and a sensing unit provided at the tub or the cabinet so as to detect the magnetism of the magnetic body.

The housing may include a first circular circumferential surface and a second circular circumferential surface, and the actuator may come into contact with the second circular circumferential surface. The housing may include a recess, which is depressed toward a rotational axis of the drum from the receiving space, and the actuator may be mounted in the recess.

In another example of the present invention, the housing may include a housing opening, which is open toward a rotational axis of the drum, and the actuator may be coupled to the housing opening. Teeth of the rotating gear may project into the receiving space. The gear teeth may be provided at an inner circumferential surface of the ring.

The present invention provides the laundry treatment apparatus that may further include a first motor and a first rotating gear, which transmit rotational force to the first ring; and a second motor and a second rotating gear, which transmit rotational force to the second ring. The first rotating gear and the second rotating gear may be positioned at different levels. The ring may be composed of a chain, which is engaged with the teeth of the rotating gear so as to be moved.

The present invention provides the laundry treatment apparatus that may further include an equilibrium weight for preventing eccentricity of the drum caused by load of the actuator. The equilibrium weight may be provided at a point on the housing that is opposite the actuator.

The present invention provides the laundry treatment apparatus that may further include a power supply for supplying power to the actuator. The power supply may include a rotating shaft for rotating the drum; a shaft through hole provided in the rotating shaft; and a shaft-connecting wire connected to an outside through the shaft through hole and connected to the actuator so as to supply power to the actuator.

The present invention may further include a shaft socket, which is provided therein with the shaft-connecting wire and which comes into electrical contact with the shaft-connecting wire at opposite ends thereof, the shaft socket being disposed in the shaft through hole. The present invention may further include a second body secured to the rotating shaft so as to come into electrical contact with the shaft-connecting wire; and a first body connected to a power source and configured to come into electrical contact with the second body.

Advantageous Effects

The present invention has an effect of providing a laundry treatment apparatus capable of actively resolving an unbalanced state of a drum independently of rotation of the drum. Furthermore, the present invention has an effect of providing a laundry treatment apparatus capable of performing precise control of position of a balancing unit provided at a drum.

BEST MODE

Hereinafter, preferred embodiments of the present invention will be described in detail with reference to the accompanying drawings. Unless otherwise specially indicated, all terms used in the specification are identical to general meanings of the terms understood by a person having ordinary skill in the art. If a term used in the specification conflicts with the general meaning of the term, the meaning should comply with a definition noted in the specification. In the designation of directions in the specification, when a user views a laundry treatment apparatus from the door side, the door side of the laundry treatment apparatus is defined as front, and the motor side of the laundry treatment apparatus is defined as the rear. In this case, the left and right of the user are respectively defined as left and right.

It should be noted herein that the construction of an apparatus, which will hereinafter be described, and a method of controlling the apparatus are given only for illustrative purposes, and the protection scope of the invention is not limited thereto. Wherever possible, the same reference numbers will be used throughout the drawings to refer to the same or like parts.

Figure 1:
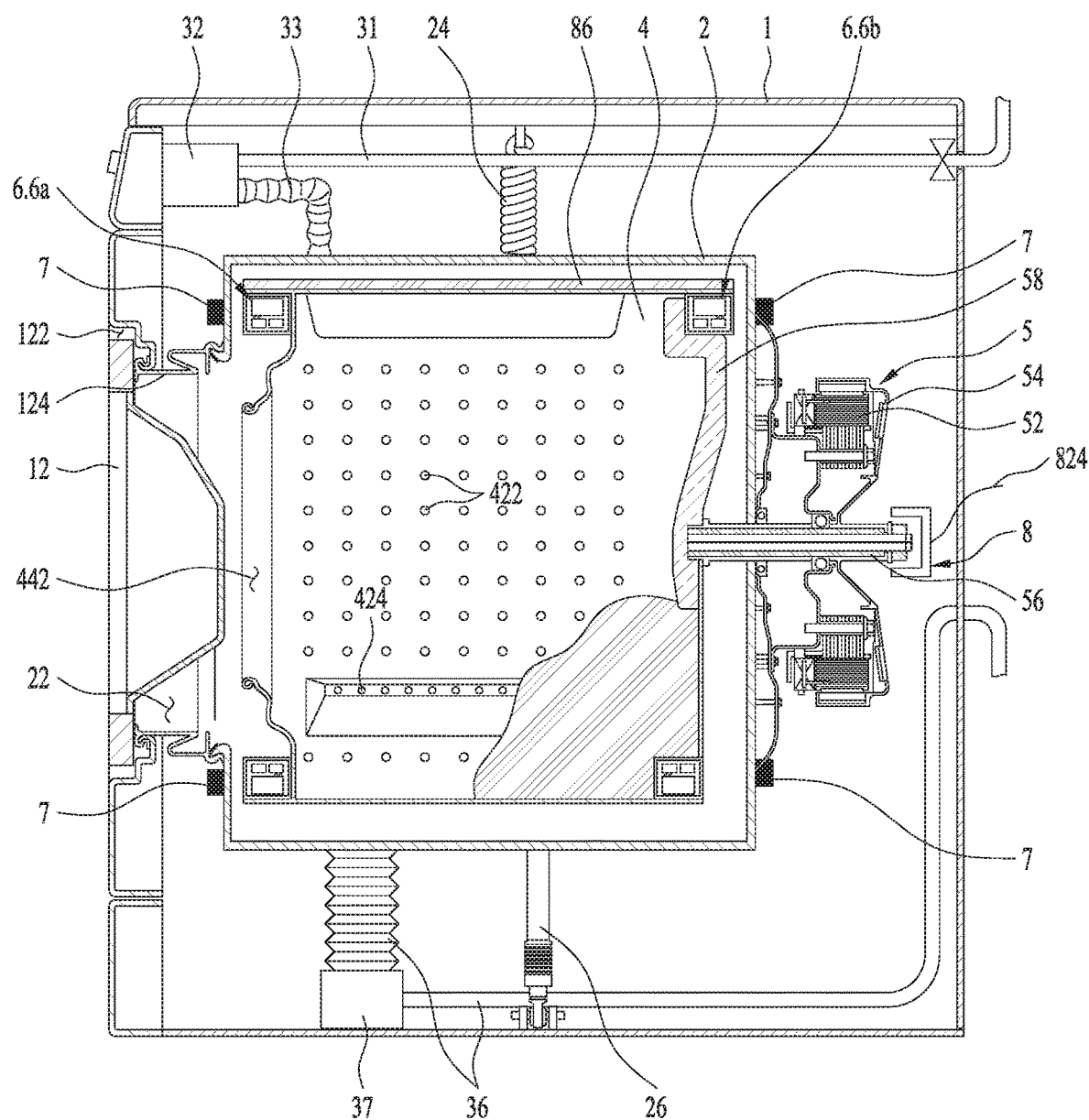
FIG. 1 is a view illustrating an example of a laundry treatment apparatus according to the present invention.

FIG. 1 illustrates an example of a laundry treatment apparatus according to the present invention. The laundry treatment apparatus according to the present invention will be described with reference to FIG. 1.

The laundry treatment apparatus according to the present invention includes a cabinet 1, a tub 2 disposed in the cabinet 1 to contain washing water, and a drum 4 rotatably disposed in the tub 2 to contain laundry. The cabinet 1 defines the appearance of the apparatus, and includes a first introduction port or opening 122, through which laundry is put into and taken out of the apparatus, and a door 12 for opening and closing the first introduction port 122.

The cabinet 1 may be provided therein with the tub 2 for containing washing water. The tub 2 may be provided therein with the drum 4, which is rotatable and is configured to contain laundry therein.

The tub 2 is supported by a tub support in the cabinet, and the tub support includes a spring 24 provided at an upper portion of the tub 2 and a damper 26 provided at a lower portion of the tub. The tub 2 is connected to and supported by the cabinet 1 by means of the tub support. The tub support prevents vibration of the tub 2 from being transmitted to the cabinet.

The tub 2 and the drum 4 are configured to have a cylindrical shape, and are respectively provided in the front thereof with a second introduction port or opening 22 and a third introduction port or opening 442. Accordingly, a user may put laundry into the drum 4 or take the laundry out of the drum through the first introduction port 122, the second introduction port 22 and the third introduction port 442.

A gasket 124 may be provided between the first introduction port 122 and the second introduction port 22 so as to prevent washing water in the tub 2 from leaking to the outside and to prevent vibration of the tub 2 from being transmitted to the cabinet 1. Here, the gasket 124 may be made of an elastic material.

The cabinet 1 may include a water supply pipe 31 through which washing water is supplied to the tub and a detergent box 32 for supplying detergent to the tub 2. The detergent box 32 may be composed of a drawer-type box, which is drawable from the front surface of the cabinet 1. The water supply pipe 31 may be directly connected to the tub 2. Alternatively, the water supply pipe 31 may be connected to the detergent box 32. In this case, detergent contained in the detergent box 32 is mixed with washing water supplied from the water supply pipe 31, and is then supplied to the tub 2 through a detergent supply pipe 33 connecting the detergent box 32 to the tub 2.

In order to discharge the washing water contained in the tub 2, the apparatus 100 includes a water discharge pipe 36 and a water discharge pump 37. The laundry treatment apparatus according to the present invention may further include a drive unit (or motor) 5 for rotating the drum 4. The driving unit 5 includes a stator 52 provided at the tub 2 to generate a magnetic field, a rotor 54 for generating rotational force using the magnetic field generated by the stator 52, a rotating shaft 56 connected to the rotor 54 and penetrating the rear surface of the tub 2, and a spider 58 connected to the rotating shaft 56 and fixed to the rear surface of the drum 4.

Figure 2:
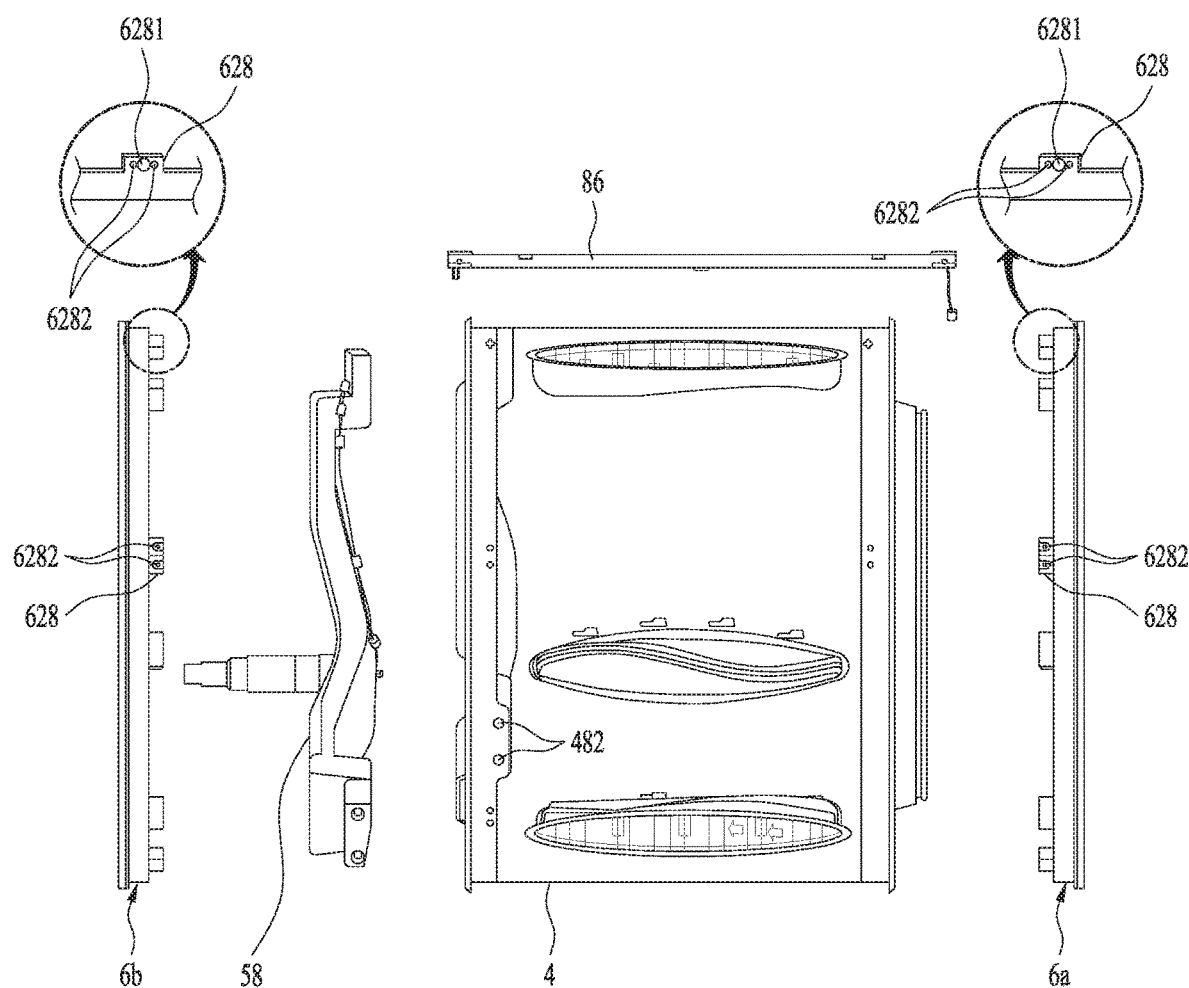
FIG. 2 is an exploded perspective view of a portion of the laundry treatment apparatus according to the present invention.
Figure 3:
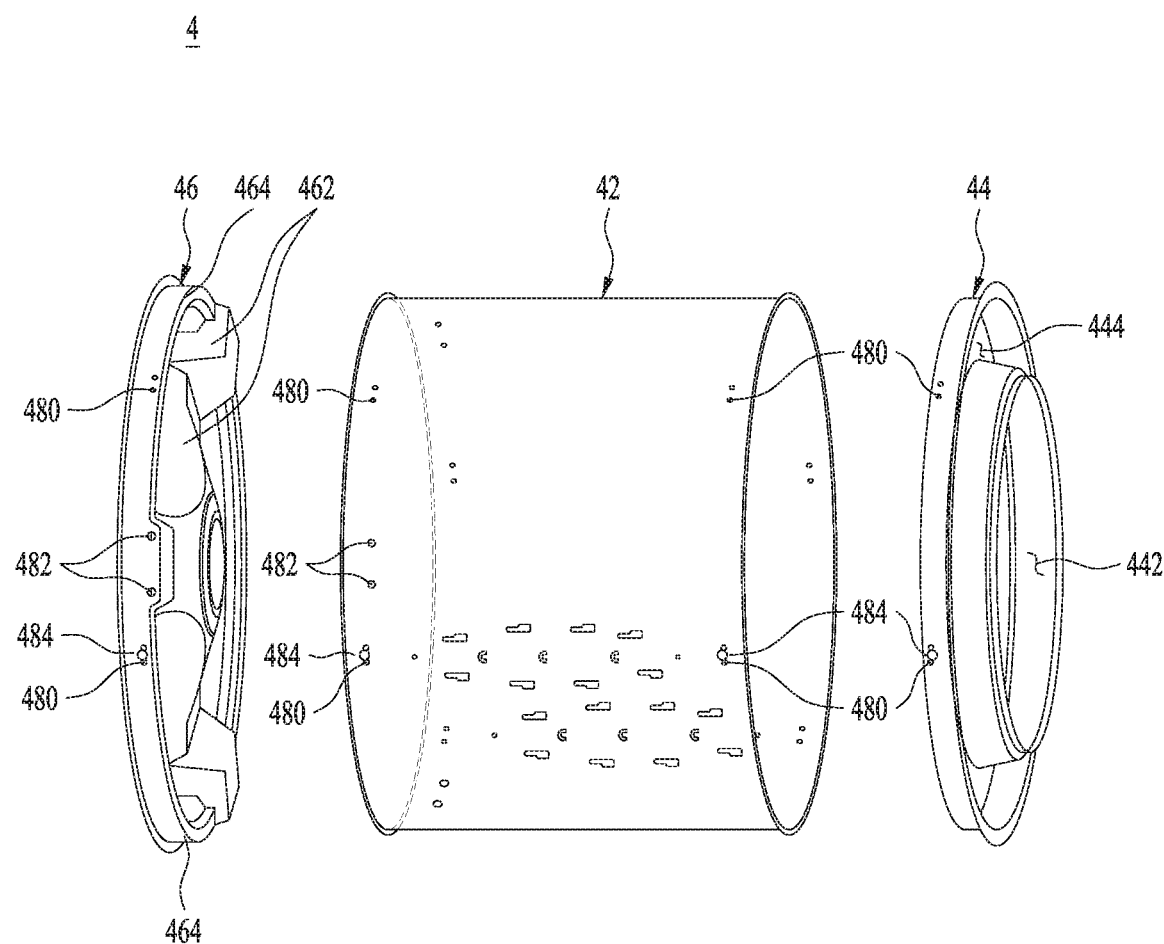
FIG. 3 is an exploded perspective view of a drum provided in the laundry treatment apparatus according to the present invention.

FIG. 2 is an exploded perspective view of a portion of the laundry treatment apparatus according to the present invention. FIG. 3 is an exploded perspective view of the drum provided in the laundry treatment apparatus according to the present invention.

A balancer according to the present invention will now be described with reference to FIGS. 2 and 3. The laundry treatment apparatus according to the present invention includes the balancer 6a and 6b provided at the drum 4 to resolve the unbalanced state of the drum 4.

The balancer 6a and 6b may be provided at only one of the front and rear surfaces of the drum 4, or may be provided at both the front and second surfaces of the drum 4. A front balancer 6a and a rear balancer 6b are different from each other in installation position, but are the same in internal structure. Accordingly, the structure of the balancer, which will now be described, may be equally applied to both the front balancer 6a and the rear balancer 6b.

The drum 4 includes a cylindrical drum body 42 open at the front and rear surfaces thereof, a front drum surface member (or front drum balancer housing) 44 provided at the opening in the front of the drum body 42 and a rear drum surface member (or rear drum balancer housing) 46 provided at the opening in the rear of the drum body 42. The drum body 42 includes a lifter 424 provided at the inner circumferential surface of the drum body 42 to lift laundry during rotation of the drum 4 and a plurality of drum through holes 422 formed in the drum body 42 to allow washing water contained in the tub 2 to be introduced into and discharged from the drum 4.

The front drum surface member 44 includes the above-mentioned third introduction port 442 and a front balancer receiver or groove 444, which is depressed along the periphery of the front drum surface member and in which the front balancer 6a is received. The rear drum surface member 46 includes a rear balancer receiver (or rear balancer receiving wall) 464, which is depressed along the periphery of the rear drum surface member 46 and in which the rear balancer 6b is received, and a spider receiver 462, which is depressed in a shape corresponding to the shape of the spider 58 so as to receive the spider 58 therein.

In order to fit and fix the front drum surface member 44 into the inner circumferential surface of the drum body 42 through the opening in the front of the drum body 42, first drum-fastening holes 480 are formed both in the drum body 42 and in the front drum surface member 44. In order to fit and fix the rear drum surface member 46 into the inner circumferential surface of the drum body 42, the first drum-fastening holes 480 are also formed in both the drum body 42 and the rear drum surface member 46.

The first drum-fastening holes 480 are fastened to housing-fastening holes 6282 in housing-fastening protrusions 628 provided at a housing 62 of the balancer 6 by means of fastening elements. As a result, it is possible to secure the drum body, the front drum surface member and the front balancer to each other, and to secure the drum body, the rear drum surface member and the rear balancer to each other.

In order to secure the spider 58 to the drum 4, second drum-fastening holes 482 are formed in the drum body 42 and the rear drum surface member 46 such that the second drum-fastening holes 482 in the rear drum surface member 46 and the drum body 42 are aligned with each other when the rear drum surface member 46 is fitted into the opening in the rear of the drum body 42. Particularly, the second drum-fastening holes 482 are provided at the spider receiver 462.

The spider 58 includes a spider core 582 connected to the rotating shaft 56 and spider arms 584 radially extending from the spider core 582 and secured to the rear surface of the drum. The spider arms 584 may include three spider arms (see FIG. 13). specifically, each of the spider arms 584 includes a first spider arm 584*a* connected to the spider core 582 and extending radially therefrom, a second spider arm 584*b* connected to the first spider arm 584*a* and bent forwards and a third spider arm 584*c* connected to the second arm 584*b* and bent outwards.

The third arm 584*c* includes a spider-fastening groove 586, which is depressed forwards. The housing-fastening protrusion 628 provided at the housing 62 of the balancer is fitted into the spider-fastening groove 586.

Figure 4:
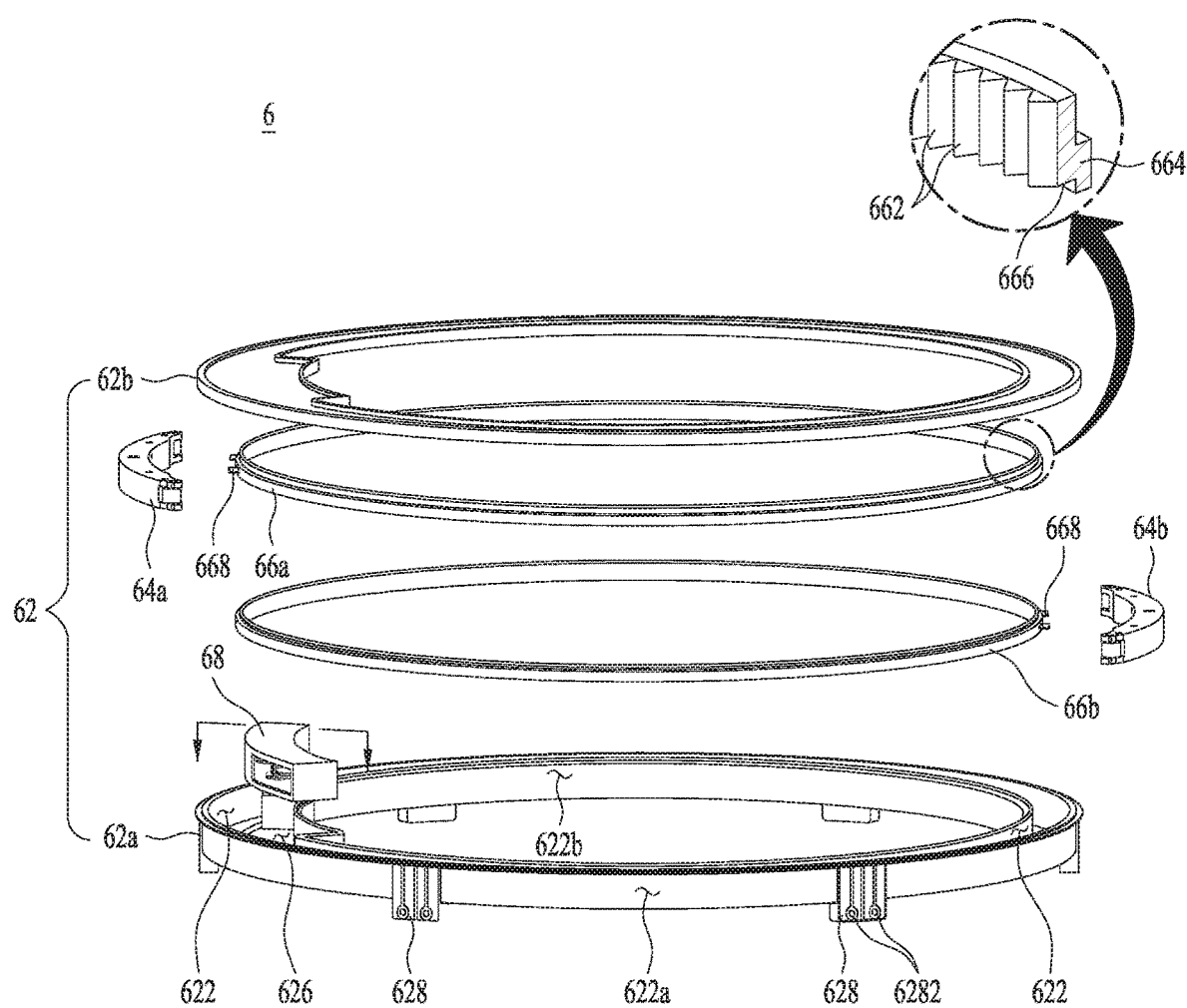
FIG. 4 is an exploded perspective view of a balancer according to the present invention.
Figure 5:
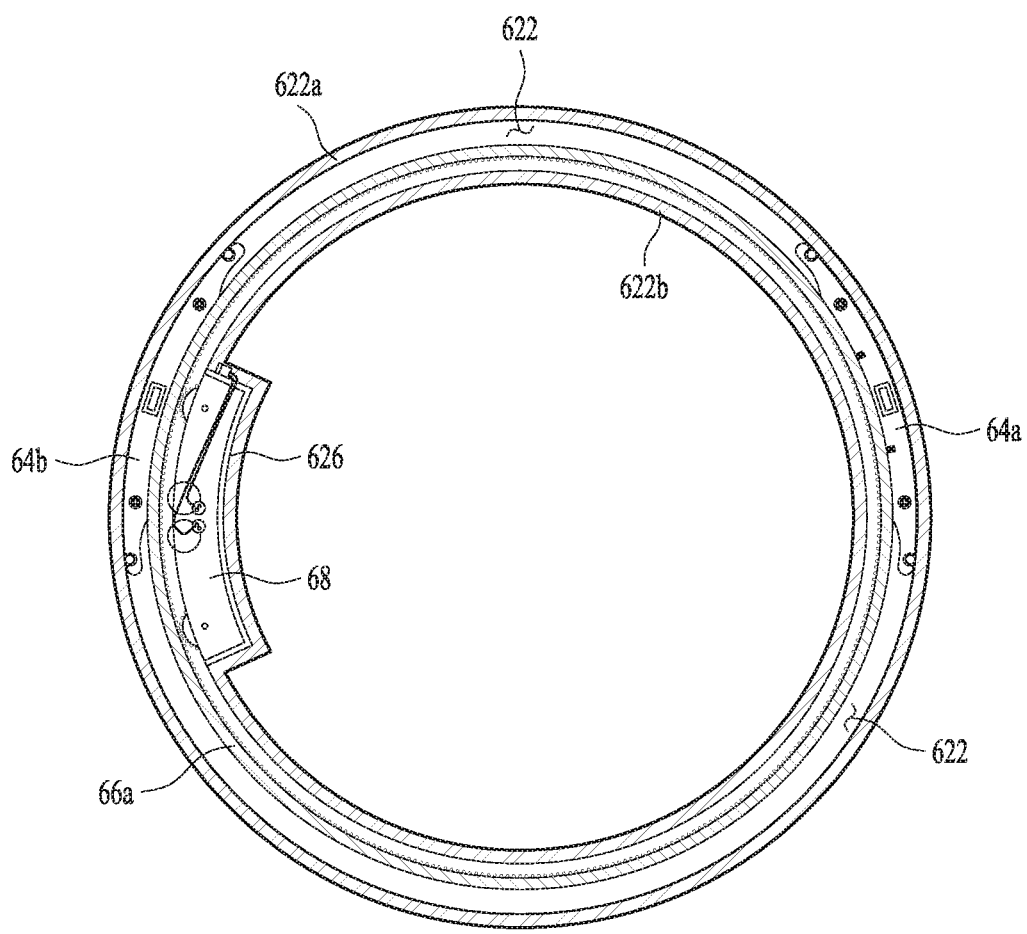
FIG. 5 is a cross-sectional view of the balancer according to an embodiment of the present invention.
Figure 6:
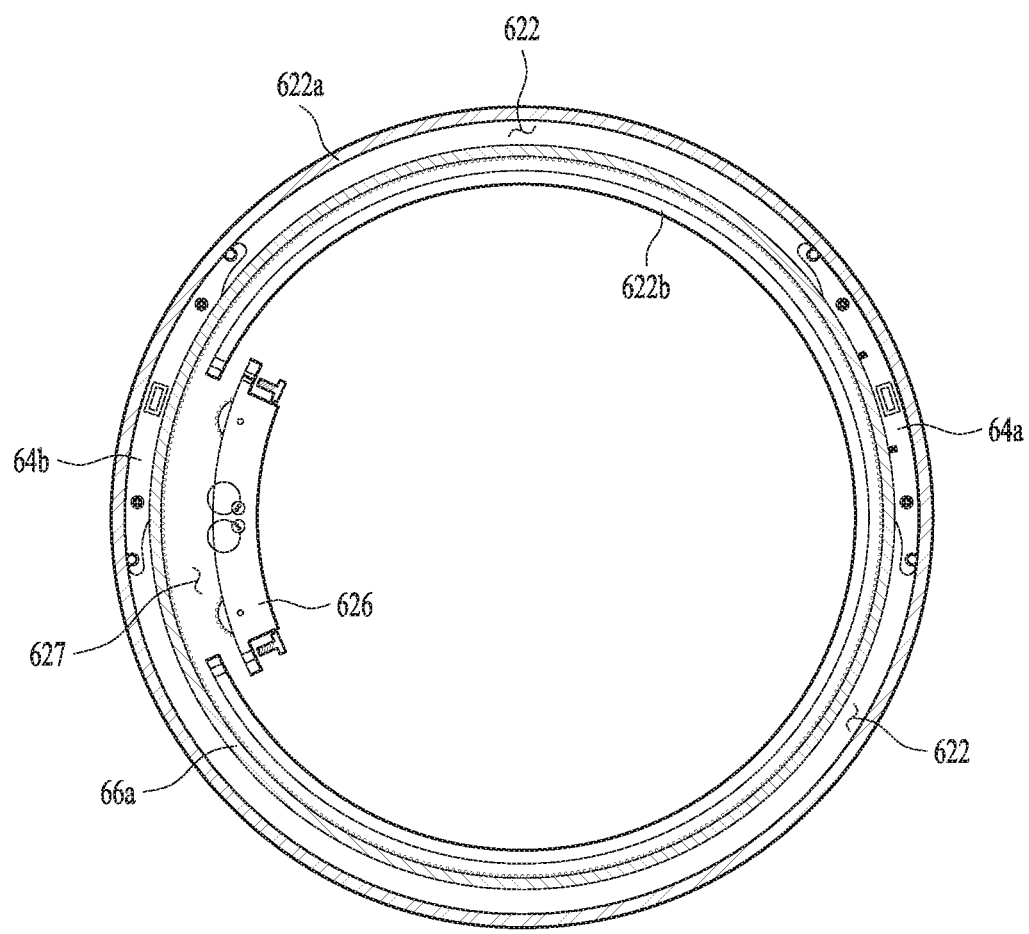
FIG. 6 is a cross-sectional view of a balancer according to another embodiment of the present invention.

FIG. 4 is an exploded perspective view of the balancer according to the present invention. FIG. 5 is a cross-sectional view of the balancer according to an embodiment of the present invention. FIG. 6 is a cross-sectional view of a balancer according to another embodiment of the present invention.

As illustrated in FIG. 4, the balancer includes a housing 62 secured to the drum 4, a receiving space or groove 622 defined in the housing 62 so as to define a closed loop, a balancing unit (or counter weight) 64 movably disposed in the receiving space 622 so as to resolve the unbalanced state of the drum 4, a ring 66 connected to the balancing unit 64 so as to move the balancing unit 64, and an actuator 68 for moving the ring 66. The housing 62 includes a housing body 62*a* secured to the drum 4 and having one open side and a housing cover 62*b* covering the open side of the housing body 62*a*.

The receiving space 622 is formed in the housing so as to define a circular trajectory, and defines a circular closed loop so as to allow the balancing unit 64 to move therein. Although the receiving space 622 is preferably configured to have a circular shape having a constant radius, the receiving space 622 may also be configured to have an elliptical shape having a varying radius.

The housing 62, which defines the receiving space 622, includes a first circular circumferential surface 622*a*, a second circular circumferential surface 622*b* having a smaller diameter than the first circular circumferential surface 622*a*, a second side surface 622*d* connecting the first circular circumferential surface 622*a* to the second circular circumferential surface 622*b* so as to come into contact with the drum 4, and a first side surface 622*c* disposed opposite the second side surface 622*d* and connecting the first circular circumferential surface 622*a* to the second circular circumferential surface 622*b*. In other words, the receiving space 622 is a space defined by the first circular circumferential surface 622*a*, the second circumferential surface 622*b*, the first side surface 622*c* and the second side surface 622*d*, which are connected to each other.

As illustrated in FIGS. 4 and 5, the housing 62 may include a recess 626 connected to the receiving space 622. The recess 626 is configured to have a shape corresponding to the external appearance of the actuator 68 and to be depressed toward the rotational axis of the drum 4. In other words, the recess 626 is depressed from the second circumferential surface 622*b* toward the rotational axis of the drum 4.

The recess 626 is provided therein with the actuator 68. Here, the actuator 68 should not project into the receiving space 622. The reason for this is because the actuator 68 may interfere with the movement of the balancing unit 64, which moves in the receiving space 622, if the actuator 68 projects into the receiving space 622.

Accordingly, the balancing unit 64 may move in the receiving space 622 defining a circular trajectory. In other words, the balancing unit 64 may rotate 360 degrees along the receiving space.

As illustrated in FIG. 6, the housing 62 includes a housing opening 627, which communicates with the receiving space 622 so as to open toward the rotational axis of the drum 4. The actuator 68 is coupled to the housing opening 627.

Specifically, the housing opening 627 is provided in the second circular circumferential surface 622*b*, and the actuator 68 is fastened to opposite ends of the second circular circumferential surface 622*b* defining the housing opening 627. In this case, technology for fastening the actuator 68 to the second circular circumferential surface 622*b* may include bolting using a bolt, adhesion using an adhesive, hook-and-loop fastening and the like. Consequently, since the material corresponding to the recess 626 is saved, as illustrated in FIG. 5, it is possible to reduce the total manufacturing cost and to make it easy to replace the actuator 68 provided in the housing.

Figure 8:
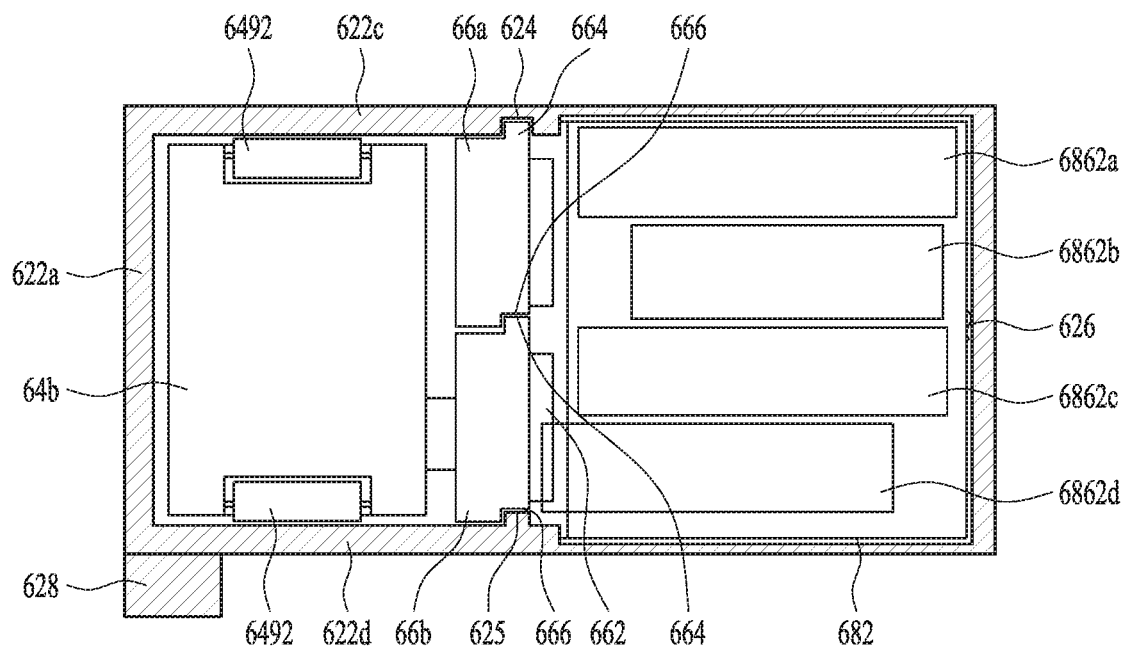
FIG. 8 shows a cross-sectional view of a portion of the housing according to the present invention at which an actuator is provided shown on top with label (a) and a cross-sectional view of a housing according to the present invention shown on bottom with label (b)
Figure 8:
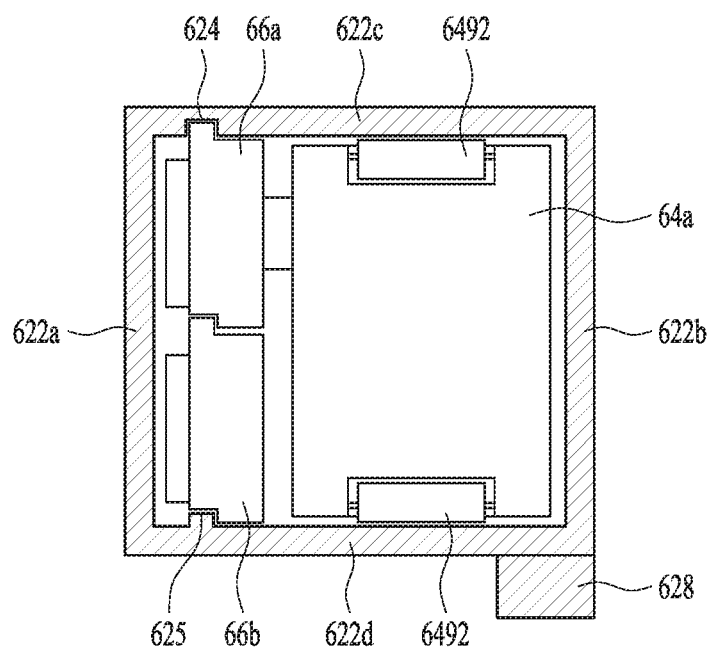

The first side surface 622*c* and/or the second side surface 622*d*, which define the receiving space 622, may be provided with a receiving-space groove 624 or a receiving-space protrusion 625 for guiding a ring-fastening protrusion 668 provided at the ring 66 (see FIG. 8). A detailed description thereof will be given later.

Figure 7:
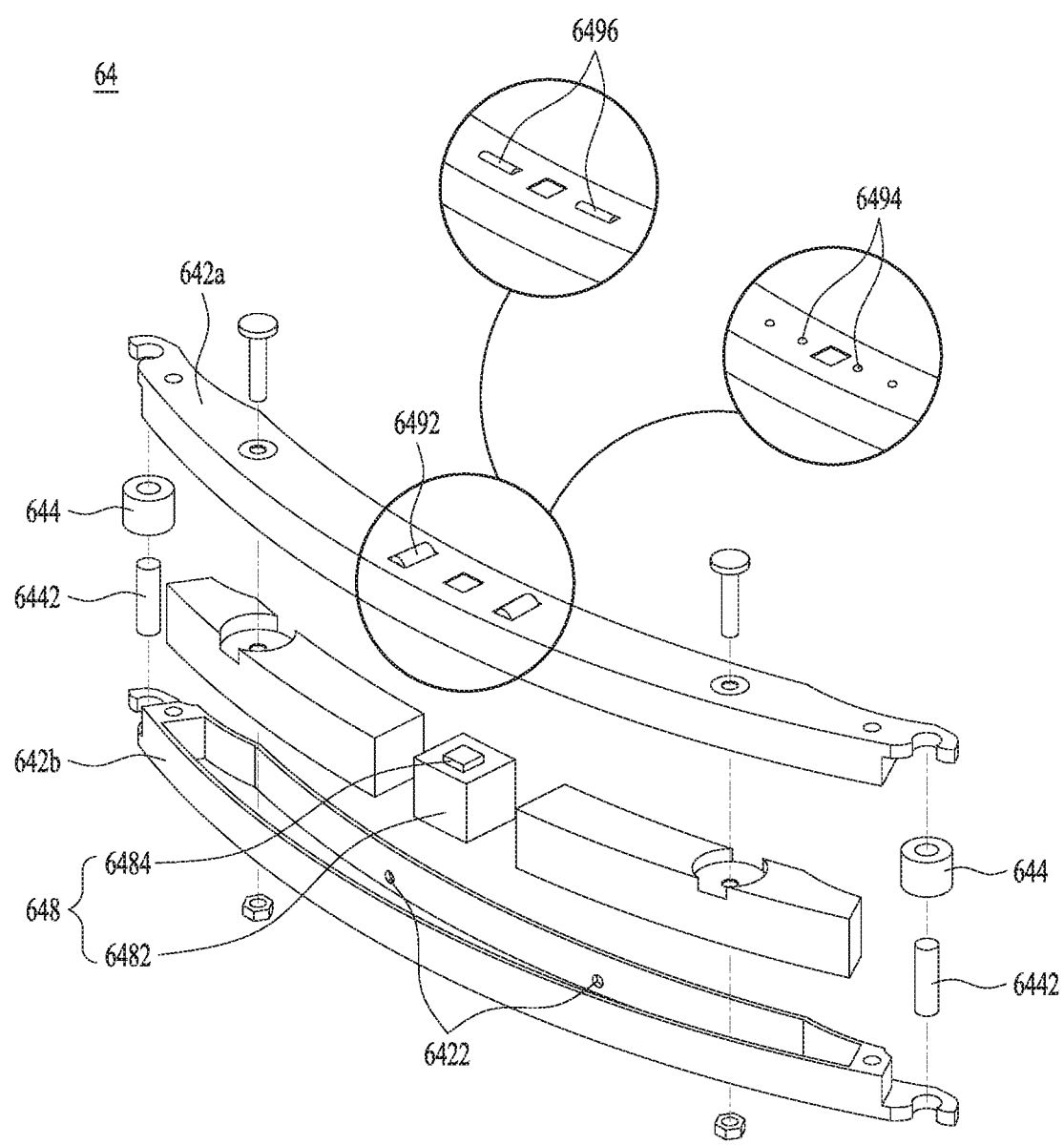
FIG. 7 is an exploded perspective view of a balancing unit according to the present invention.

FIG. 7 is an exploded perspective view of the balancing unit according to the present invention. FIG. 8(*a*) is a cross-sectional view of a portion of the housing according to the present invention at which the actuator is provided. FIG. 8(*b*) is a cross-sectional view of the housing according to the present invention. Hereinafter, the balancing unit according to the present invention will be described with reference to FIG. 7.

The balancing unit 64 is movably provided in the receiving space 622. Specifically, the balancing unit 64 revolves about the rotational axis of the drum 4 along the receiving space 622 so as to resolve the unbalanced state of the drum 4.

Although only one balancing unit 64 may be provided in the receiving space 622, a pair of balancing units 64 is preferably provided in order to more efficiently resolve the unbalanced state of the drum 4. The pair of balancing units includes a first balancing unit (or first counter weight) 64*a* and a second balancing unit (or second counter weight) 64*b*. Here, since the first balancing unit 64*a* and the second balancing unit 64*b* have the same structure, the description of the balancing unit 64, which will now be given, may be applied to both the first balancing unit 64*a* and the second balancing unit 64*b*.

The balancing unit 64 includes a unit body 642 defining the appearance of the balancing unit and rollers 644 and 6442 provided at opposite ends of the unit body 642. The shape of the unit body 642, that is, the shape of the balancing unit, is circumferentially curved with respect to the rotational axis of the drum so as to smoothly move in the receiving space 622.

The unit body 642 includes an upper unit body 642*a* and a lower unit body 642*b*, which are configured to mate with each other. The upper unit body 642*a* and the lower unit body 642*b* may be secured to each other by means of screws, bolts or the like.

The unit body 642 is provided with unit-body-fastening holes 6422 to which the ring 66 is fastened. The unit-body-fastening holes 6422 are formed in both the upper unit body 642*a* and the lower unit body 642*b*. Accordingly, the ring 66 is fastened to the unit-body-fastening holes 6422 formed in the upper unit body when the balancing unit 64 having the same shape is intended to be used as the first balancing unit 64*a*, and is fastened to the unit-body-fastening holes 6422 formed in the lower unit body 642*b* when the balancing unit 64 is intended to be used as the second balancing unit body 64*b*.

The balancing unit 64 is connected to the outer circumferential surface of the ring 66. At this time, the ring-fastening protrusion 668 formed on the outer circumferential surface of the ring 66 is fitted into and fixed to the unit-body-fastening hole 6422 (see FIG. 4).

Alternatively, the ring-fastening protrusion 688 may be provided at the balancing unit 64 while the unit-body-fastening holes 6422 may be provided at the ring 66.

The unit body 642 includes a weight member 646 therein in order to compensate for unbalanced distribution of mass of the laundry contained in the drum 4. The weight member 646 may have a predetermined weight. Here, the unbalanced distribution of mass in all of laundry treatment apparatuses having various specifications may be compensated for by applying a weight member 646 having a weight conforming to the specification of the laundry treatment apparatus. The weight members 646 includes a pair of weight members, which are symmetrically disposed at opposite sides of the balancing unit 64 such that the center of mass of the balancing unit 64 is located at the center of the balancing unit 64. Alternatively, a single weight member may be disposed at the center of the balancing unit 64 rather than providing multiple members at opposite sides of the balancing unit 64.

The laundry treatment apparatus according to the present invention may further include a magnetic body 648 for detecting the position of the balancing unit 64. Specifically, the magnetic body 648 may be disposed in the unit body 642. The magnetic body 648 includes a magnet box 6482, which is open at one side thereof so as to distribute magnetic field only in one direction without being subjected to an influence due to an external magnetic field, and a permanent magnet 6484 disposed in the magnet box 6482 such that an N pole or an S pole thereof is positioned at the open side.

Here, the magnetic poles of the first balancing unit 64*a* and the second balancing unit 64*b* may be directed in opposite directions. For example, if the magnetic body 648 of the first balancing unit 64*a* exhibits a magnetic field corresponding to an N pole, the magnet body 648 of the second balancing unit 64*b* exhibits a magnetic field corresponding to an S pole.

The laundry treatment apparatus according to the present invention may include a sensing unit (or sensor) 7 provided at the tub 2 or the cabinet 1 so as to detect the magnetism of the magnet body 648. The sensing unit 7 may include a hall sensor capable of distinguishing an N polarity from an S polarity. The sensing unit 7 may be positioned at a level similar or equal to the level of the receiving space 622 in which the balancing unit 64 moves (see FIG. 1).

Accordingly, when the first balancing unit 64*a* and the second balancing unit 64*b* revolve in the receiving space 622, the hall sensor 7 detects the polarity exhibited by the balancing unit 64, thereby determining the positions of the first balancing unit 64*a* and the second balancing unit 64*b*. In order to space the balancing unit 64 from the side surface of the receiving space 622, the side surfaces of the balancing unit 64 or the receiving space 622 may be provided with spacers 649.

Here, the side surfaces of the receiving spaces 622 mean the first side surface 622*c* and the second side surface 622*d*. FIG. 7 illustrates the case in which the spacers 649 are composed of subsidiary casters 6492 provided at the unit body 642, the case in which the spacers 649 are composed of spacing bars 6496 provided at the unit body 642 and, the case in which the spacers 649 are composed of spacing protrusions 6494 provided at the unit body 642.

In the case of being composed of the spacing bars 6496, each of the spacing bars may be curved into an arc shape having a predetermined length. Consequently, as illustrated in FIG. 8, the balancing unit 64 revolves in the state of being spaced apart from the first side surface 622*c* and the second side surface 622*d* by means of the spacers 649. Particularly, the spacers 649, which are composed of subsidiary casters 6492, serve to facilitate movement of the balancing unit 64.

Since the balancing unit 64 has to revolve in the receiving space 622 during rotation of the drum 4, the balancing unit 64 should be made of a material having a predetermined hardness in order to resist vibration of the drum and to prevent breakage of the drum. In order to assure smooth movement of the balancing unit 64 in the receiving space 622, the balancing unit is provided at opposite ends thereof with the rollers 644 and 6442. Accordingly, the balancing unit 64 is able to smoothly revolve in the receiving space 622 in the state of being in contact with the first circular circumferential surface 622*a* of the housing 62.

When the drum 4 rotates at a rotational speed equal to or lower than a predetermined rotational speed, the balancing unit 64 is able to revolve in the receiving space 622 by virtue of the rollers 644 and 6442. Accordingly, the balancing unit 64 may compensate for the unbalanced distribution of the mass of the drum so as to restrict an inertia moment within an allowable range.

Meanwhile, when the drum rotates at a rotational speed higher than the predetermined rotational speed, the center portion of the balancing unit 64 comes into contact with the first circular circumferential surface 622*a* of the housing 62 and is held in place due to the centrifugal force applied thereto. In other words, when the balancing unit 64 is subjected to centrifugal force, the balancing unit 64 may come into surface contact with one surface of the receiving space 622, and may be held in place.

Specifically, the balancing unit 64 moves relative to the drum 4 so as to resolve the unbalanced state of the drum when the drum 4 vibrates excessively (when the rotational speed of the drum 4 is equal to or lower than the predetermined speed), and moves together with the drum 4 because the unbalanced state is somewhat resolved when the drum vibrates within a normal range (when the rotational speed of the drum 4 is higher than the predetermined rotational speed). To this end, the center of mass of the balancing unit 64 is positioned at the center of the balancing unit 64.

In addition, the balancing unit 64 may have a predetermined length so as to be bent in a radial direction due to centrifugal force. Furthermore, the balancing unit 64 may be made of an elastic material so as to be capable of being bent.

Hereinafter, the ring 66 provided in the laundry treatment apparatus according to the present invention will be described with reference to FIGS. 4, 5 and 6. The ring 66 is connected to the balancing unit 64 so as to move the balancing unit 64. The ring 66 is provided in the receiving space 622, and revolves together with the balancing unit 64 in the receiving space 622. In other words, the balancing unit 64 according to the present invention does not have a separate power source, and is fixedly connected to the ring 66. Accordingly, it is possible to resolve the unbalanced state of the drum 4 by moving the ring 66, thus moving the balancing unit 64 in the receiving space 622.

The ring 66 is configured to form a circular closed loop. Although not illustrated in the drawings, the ring 66 may also be composed of a portion of an arc having an open curve shape. In other words, the ring 66 may have an "O" shape or a "C" shape.

The ring 66 is coupled to the balancing unit 64 having a predetermined weight and moves in the receiving space 622 by means of the actuator 68 in order to resolve unbalanced distribution of mass of the drum 4. Accordingly, when the ring 66 is deformed owing to the low strength thereof during the rotation thereof, the balancing unit 64 may collide with the inner surface of the housing 62 defining the receiving space 622, thereby causing breakage or stoppage of the balancing unit 64, which is problematic.

In order to prevent this problem, it is critical for the ring 66 to have a strength such that the ring 66 is not subjected to deformation caused by external force resulting from movement and/or load of the balancing unit 64. For example, the ring 66 may be made of a reinforced plastic material or a metal material.

The ring 66 may include a first ring 66a and a second ring 66b, disposed below the first ring 66a, which have the same diameter. The first ring 66a may be connected to the first balancing unit 64a, and the second ring 66b is connected to the second balancing unit 64b.

Here, the ring-fastening protrusion 668 provided at the first ring 66a is fitted into and fixed to the unit-body-fastening hole 6422 provided in the upper unit body 642a of the first balancing unit 64a, and the ring-fastening protrusion 668 provided at the second ring 66b is fitted into and fixed to the unit-body-fastening hole 6422 provided in the lower unit body 642b of the second balancing unit 64b. Accordingly, the overall size of the balancing unit 64 may conform to the receiving space 622.

When external force, which is higher than the strength of the ring 66, is generated by the balancing unit 64, there may be a problem in that the external form of the ring 66 is deformed. If the external form of the ring 66 is deformed, there may be a problem in that revolution of the balancing unit 64 caused by the actuator 68 is not smooth or in that the position of the balancing unit 64 cannot be accurately detected.

In order to solve this problem, as illustrated in FIG. 8, the ring 66 may be provided with a ring guide protrusion 664 and/or a ring guide groove 666, and the receiving space 622 may be provided with a receiving-space groove 624 and/or a receiving-space protrusion 625, which respectively correspond to the ring guide protrusion 664 and/or the ring guide groove 666.

The ring guide protrusion 664 may be provided at an upper portion of the first ring 66a, and the ring guide groove 666 may be provided at a lower portion of the first ring 66a. The second ring 66b may be configured to have the same shape as the first ring 66a, and the ring guide protrusion 664 of the second ring 66b may be engaged with the ring guide groove 666 of the first ring 66a. The first side surface 622c of the receiving space 622 may be provided with the receiving-space groove 624 so as to guide and hold the ring guide protrusion 664 of the first ring 66a. The second side surface 622d of the receiving space 622 may be provided with the receiving-space protrusion 625, which is fitted into and held in the ring guide groove 666 in the second ring 66b.

Although FIG. 8 illustrates a structure in which the ring guide protrusion 664 is provided at one side of an upper portion of the ring 66, the present invention is not limited thereto. For example, the ring guide protrusion 664 may be provided at the center of the upper portion of the ring 66.

Figure 12:
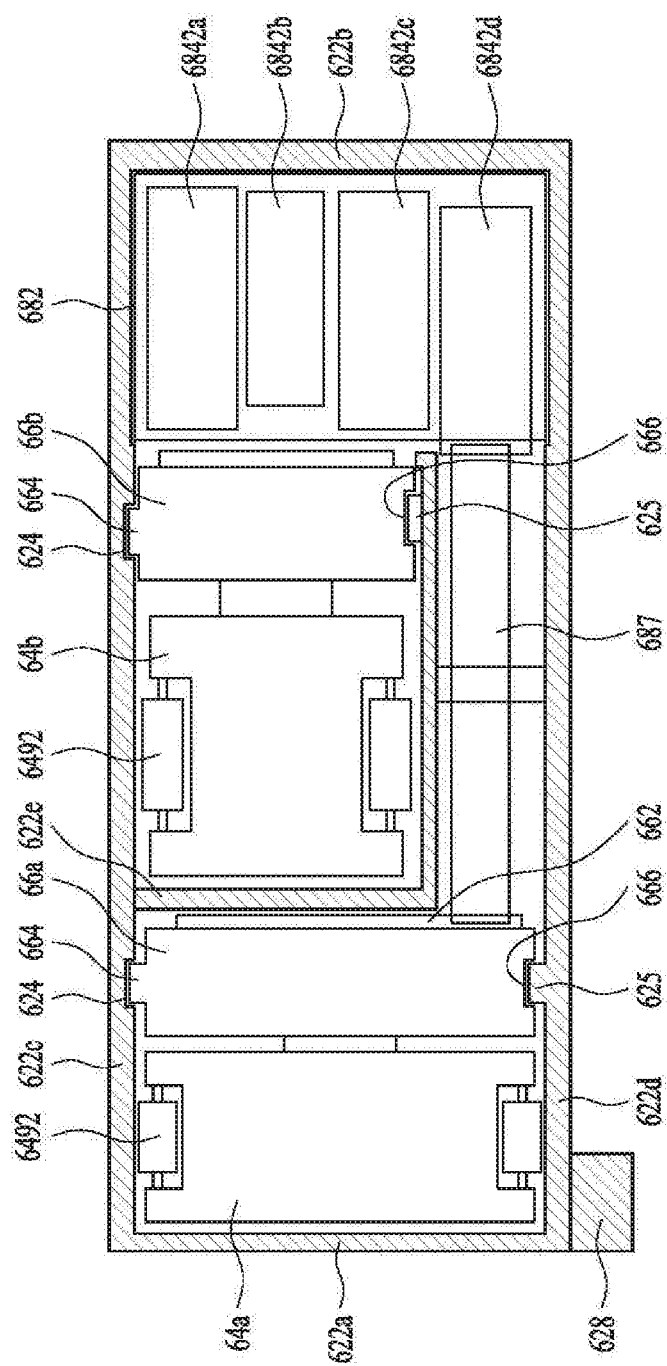
FIG. 12 is a cross-sectional view of the balancer of FIG. 11, which is another example of the present invention.

Furthermore, although FIG. 8 illustrates a structure in which the ring guide groove 666 is provided at one side of the lower portion of the ring 66, the ring guide groove 666 may be provided at the center of the lower portion of the ring 66, unlike the previous structure (see FIG. 12).

The ring 66 may include gear teeth 662 formed on the surface thereof and engaged with rotating gears 6842 and 6862 provided at the actuator 68 so as to receive rotational force (see FIG. 4). Accordingly, when the rotating gears 6842 and 6862 of the actuator 68 are rotated, the ring 66 including the gear teeth 662, engaged with the rotating gears 6842 and 6862, is also rotated, and the balancing unit 64 is also rotated in the receiving space 622.

Specifically, the ring includes the gear teeth 662 provided at the inner circumferential surface thereof. In other words, the ring 66 serves as an internal gear. The reason for this is to cause the gear teeth 662 to be engaged with the rotating gears 6842 and 6862 of the actuator 68 provided at the second circular circumferential surface 622b of the housing 62.

In another embodiment, the ring 66 may be configured to have a chain form (not shown) so as to be engaged with the rotating gears 6842 and 6862 of the actuator 68 and to be moved. In a further embodiment, the ring 66 may have high surface roughness so as to be moved by virtue of frictional force between the rough surface and the surfaces of the rotating gears of the actuator 68. However, the ring 66 may be composed of an internal gear or a chain in order to control the rotational angle of the balancing unit 64.

Figure 9:
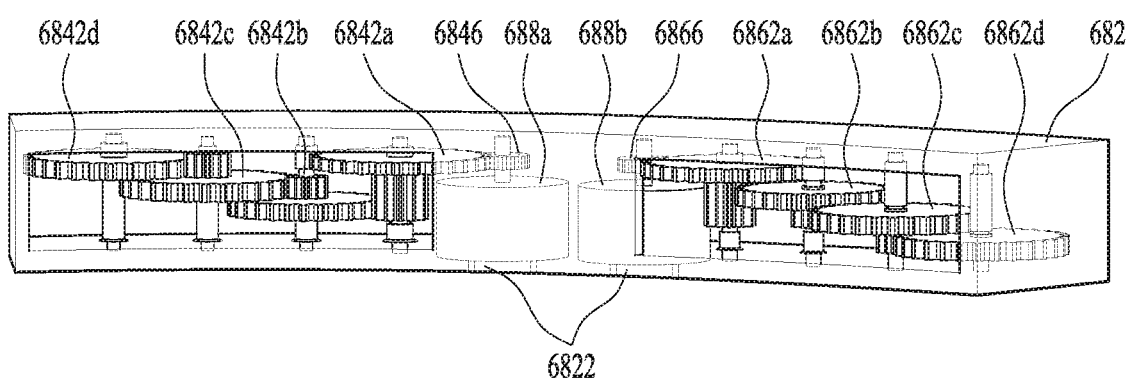
FIG. 9 is a perspective view of the actuator according to the present invention.
Figure 10:
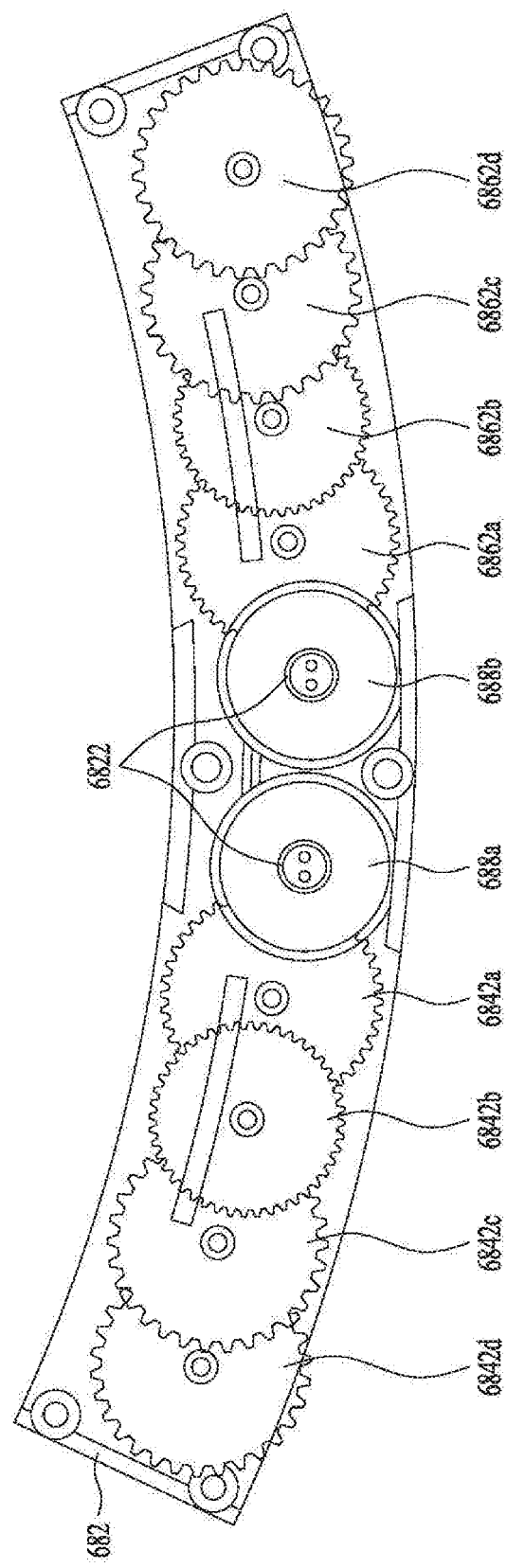
FIG. 10 is a bottom perspective view of FIG. 9.

FIG. 9 is a perspective view of the actuator according to the present invention. FIG. 10 is a bottom perspective view of FIG. 9. Hereinafter, the actuator according to the present invention will be described with reference to FIGS. 9 and 10.

The actuator 68 is disposed outside the receiving space 622. In other words, the actuator 68 is disposed outside the receiving space 622 so as not to interfere with the balancing unit 64 moving in the receiving space 622. The reason for this is to allow the balancing unit 64 to revolve 360 degrees in the receiving space 622 so as to resolve the unbalanced state of the drum 4.

Specifically, the receiving space 622 is defined by the first circular circumferential surface 622a, the second circular circumferential surface 622b, the first side surface 622c and the second side surface 622d, and the actuator 68 is positioned to be in contact with the inner circumferential surface (one of opposite surfaces of the second circular circumferential surface that faces the rotational axis of the drum).

The reason why the actuator 68 is provided at the second circular circumferential surface 622b rather than the first circular circumferential surface 622a is because the inertia moment of the drum caused by installation of the actuator 68 is reduced when the actuator 68 is positioned close to the rotational axis of the drum 4.

As described above, the actuator 68 may be provided in the recess 626 formed in the housing 62. In other words, the actuator 68 is disposed inside the housing 62 but outside the receiving space 622. Alternatively, the actuator 68 may be coupled to the housing 62 in such a manner that opposite ends of the actuator 68 are coupled to opposite sides of the housing opening 627 in the housing 62. In other words, the actuator 68 is disposed outside the housing 62 and outside the receiving space 622.

The actuator 68 includes motors 688a and 688b for generating rotational force using external power supplied thereto, and rotating gears 6842 and 6862, which are rotated by the motors 688a and 688b. The ring 66 is engaged with teeth formed at the rotating gears 6842 and 6862 and is moved. Here, the ring 66 may be composed of an internal gear or a chain.

In this embodiment, in order for the rotating gears of the actuator 68 to be engaged with the ring 66, the rotating gears 6842 and 6862 are disposed so as to project into the receiving space 622. In order to facilitate coupling to the housing 62, the actuator 68 may further include an actuator housing 62, which accommodates the motors 688*a* and 688*b* and the rotating gears 6842 and 6862 therein.

The actuator housing 62 is configured to have a sector form. Specifically, the actuator housing 62 may have a shape in which arc sections of two circles having different diameters that are defined within a predetermined angular range are connected to each other with a distance therebetween. The reason for this is because the third introduction port 442 has to be provided in the front drum surface member 44 and the rotating shaft 56 of the drum has to be provided at the rear drum surface member 46.

The actuator housing 62 is provided with power supply sockets 6822 to which external power is supplied, thereby supplying power to the motors 688*a* and 688*b*. The actuator 68 includes the first motor 688*a* for transmitting rotational force to the first ring 66*a* and the first rotating gear 6842, and the second motor 688*b* for transmitting rotational force to the second ring 66*b* and the second rotational gear 6862. Accordingly, it is possible to independently control the movement of the first balancing unit 64*a* and the second balancing unit 64*b* by independently controlling the first motor 688*a* and the second motor 688*b*.

The first rotating gear 6842 may include a first of first rotating gear (or first driven gear) 6842*a* first engaged with the first motor gear 6846, a second of first rotating gear (or first upper transmission gear) 6842*b* engaged with the first of first rotating gear 6842*a*, a third of first rotating gear (or second upper transmission gear) 6842*c* engaged with the second of first rotating gear 6842*b*, and a fourth of first rotating gear (or first drive gear) 6842*d* engaged with the third of first rotating gear 6842*c*. The first rotating gear 6842 is not necessarily composed of the four rotating gears 6842*a*, 6842*b*, 6842*c* and 6842*d*, and the number of rotating gears may be increased or reduced if necessary.

In this embodiment, each of the first rotating gears includes a driven gear for receiving rotational force and a drive gear for transmitting the rotational force, and the diameter of the driven gear is larger than the diameter of the drive gear. Here, the last first rotating gear engaged with the first ring 66*a*, that is, the fourth of first rotating gear 6842*d*, receives rotational force at the driven gear thereof and transmits the rotational force to the first ring 66*a*. Accordingly, even when the rotational speed of the first motor is low, it is possible to increase the rotational speed of the last first rotating gear.

Since a description of the second rotating gear 6862 is substantially identical to that of the first rotating gear 6842, a detailed description thereof is omitted. A second motor gear 6866 is fixed to the rotating shaft of the second motor 688*b*, and the second rotating gear 6862 includes a first of second rotating gear (or second driven gear) 6862*a*, a second of second rotating gear (or first lower transmission gear) 6862*b*, a third of second rotating gear (or second lower transmission gear) 6862*c*, and a fourth of second rotating gear (or second drive gear) 6862*d*.

The first rotating gear 6842 and the second rotating gear 6862 are positioned at different heights. The reason for this is because the first ring 66*a* is positioned at an upper level and the second ring 66*b* is positioned at a lower level. In other words, the first rotating gear and the second rotating gear 6862 are disposed at different heights in the axial direction of the drum 4. Here, the height of the first rotating gear 6842 or the second rotating gear 6862 means the height of the portion of the last rotating gear that projects into the receiving space 622.

An equilibrium weight (not shown) may be included in order to prevent eccentricity of the drum caused by the load of the actuator 68 (unbalanced distribution of mass of the drum caused by the load of the actuator). The equilibrium weight may be provided at a point of the housing 62 opposite the actuator 68. For example, the equilibrium weight may be provided at the second circular circumferential surface 622*b* of the housing 62. Furthermore, the equilibrium weight may have the same weight as that of the actuator 68.

Figure 11:
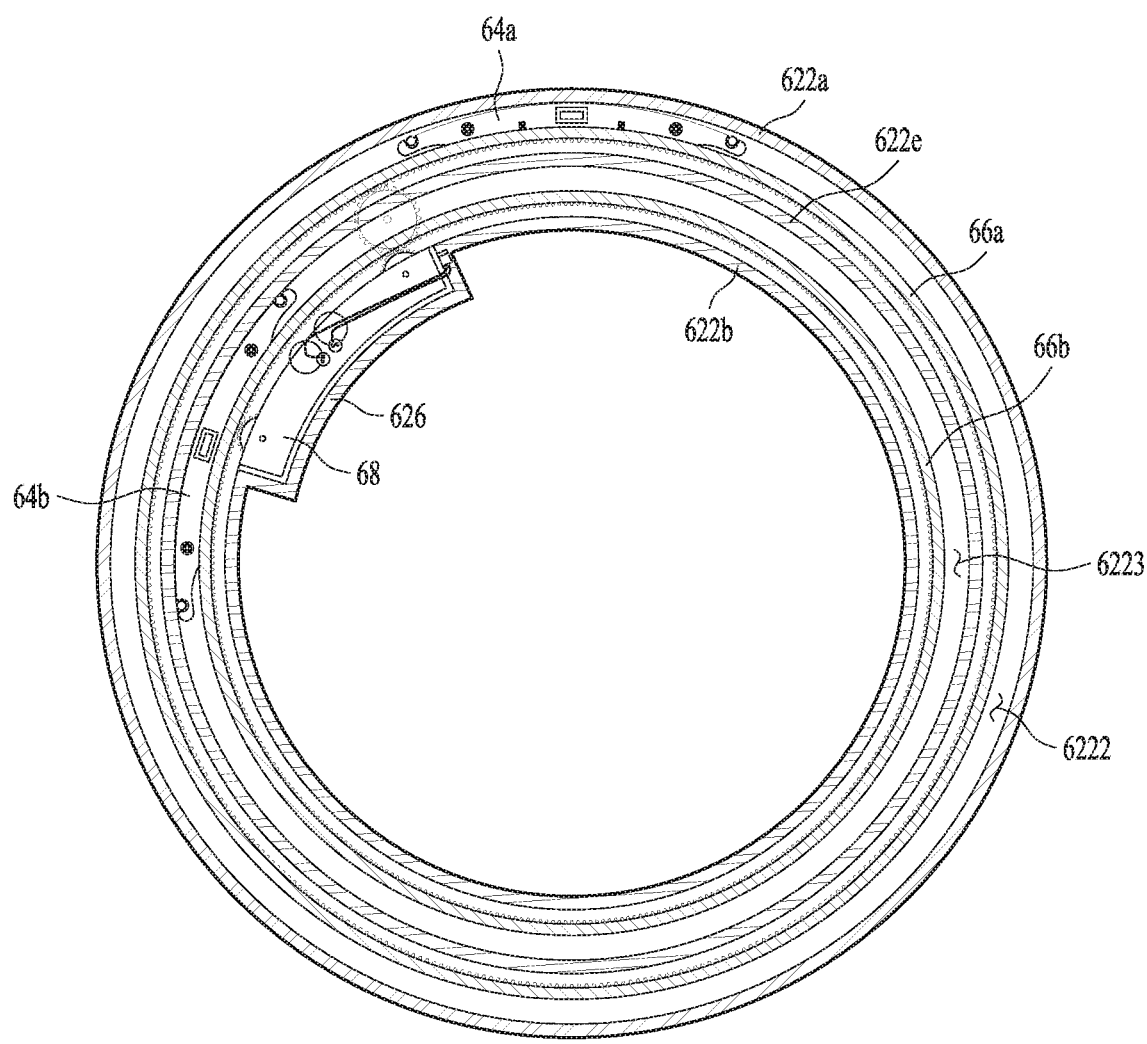
FIG. 11 illustrates another example of the balancer according to the present invention.

FIG. 11 illustrates another example of the balancer according to the present invention. FIG. 12 is a cross-sectional view of the balancer of FIG. 11, which is another example of the present invention. Referring to FIGS. 11 and 12, in another example of the balancer 6 according to the present invention, the housing 62 secured to the drum 4 is partitioned into a first receiving space 6222 and a second receiving space 6223 by means of a first partition 622*e* provided therein.

The first receiving space 6222 is provided therein with a first balancing unit 64*a* for resolving the unbalanced state of the drum and a first ring 66*a* connected to the first balancing unit 64*a*. The second receiving space 6223 is provided therein with a second balancing unit 64*b* for resolving the unbalanced state of the drum and a second ring 66*b* connected to the second balancing unit 64*b*.

The diameter of the second ring 66*b* is set to be smaller than the diameter of the first ring 66*a*. Both the first ring 66*a* and the second ring 66*b* are configured to have circular shapes that are concentrically disposed.

The first balancing unit 64*a* is disposed farther from the rotational axis of the drum 4 than the second balancing unit 64*b*, and the second balancing unit 64*b* is disposed closer to the rotational axis of the drum 4 than the first balancing unit 64*a*.

Since the first balancing unit 64*a* and the second balancing unit 64*b* are positioned at different distances from the rotational axis of the drum 4, the first balancing unit 64*a* and the second balancing unit 64*b* may have different weights in order to compensate for the inertial moment. For example, if the second balancing unit 64*b* is positioned closer to the rotational axis of the drum 4 than the first balancing unit 64*a*, the weight of the second balancing unit 64*b* may be greater than the weight of the first balancing unit 64*a*.

The first ring 66*a* and the second ring 66*b* receive rotational force from the actuator 68. The second ring 66*b* is operated in the same manner as that in the first example of the balancer 6. Specifically, upon the generation of rotational force from the second motor 688*b*, the second rotating gear 6862 engaged with the internal gear of the second ring 66*b* is rotated, and the second ring 66*b* is moved together with the second balancing unit 64*b* in the second receiving space 622.

The first ring 66*a* is provided with an interlocking gear 687 for receiving rotational force from the actuator 68. The reason for this is because the first ring 66*a* is disposed to be spaced apart from the actuator 68. The interlocking gear 687 is engaged with the first rotating gear 6842 so as to be rotated, and the interlocking gear 687, which is engaged with the internal gear of the first ring 66*a*, rotates the first ring 66*a* in conjunction with the first balancing unit 64*a*. Although the interlocking gear 687 has been described as being disposed inside the housing 62, the interlocking gear 62 may also be disposed outside the housing 62, without being limited thereto.

Figure 15:
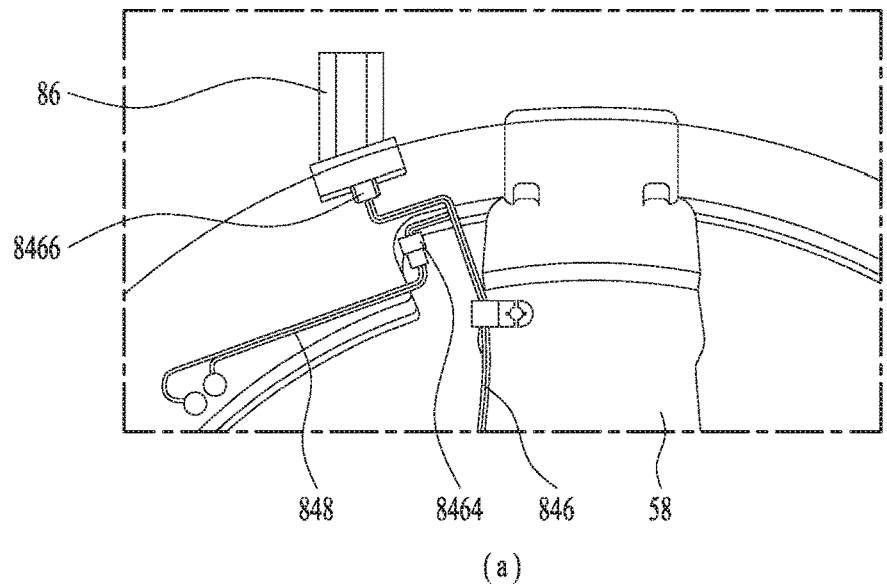
FIG. 15 shows a view illustrating the rear surface of the drum according to the present invention shown on top with label (a), a view illustrating the front surface of the drum according to the present invention shown below with label (b), and a perspective view of an actuator-connecting wire according to the present invention shown on bottom with label (c)
Figure 15:
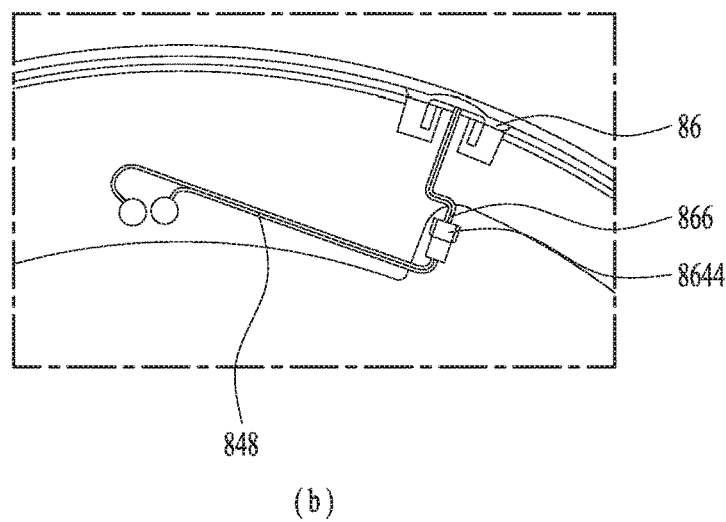
Figure 15:
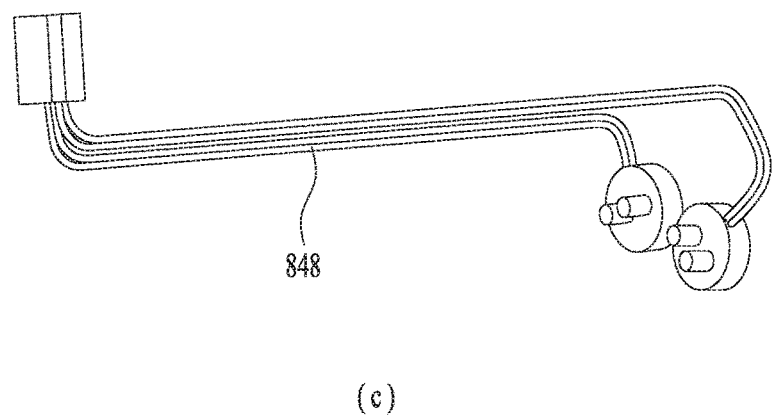
Figure 16:
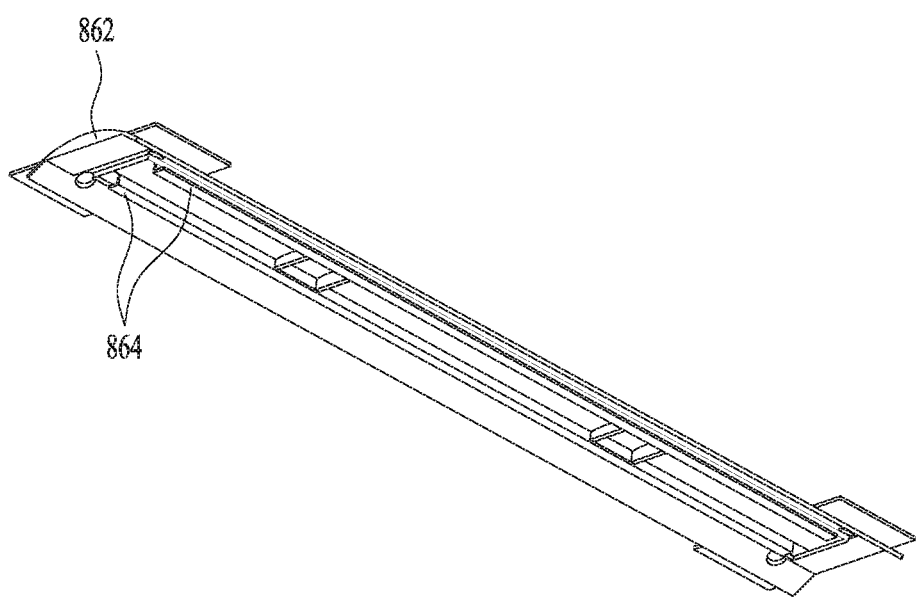
FIG. 16 is an exploded perspective view of a wire guide according to the present invention.
Figure 16:
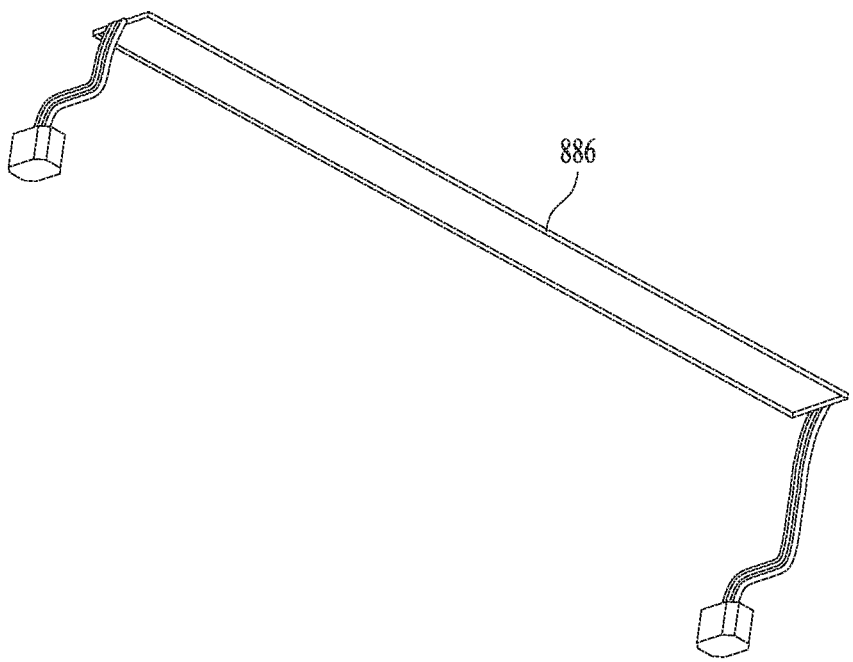

FIG. 13(a) is a cross-sectional view of the spider according to the present invention. FIG. 13(b) is a bottom view of the spider according to the present invention. FIG. 14 is an enlarged cross-sectional view of the spider according to the present invention. FIG. 15(a) is a view illustrating the rear surface of the drum according to the present invention. FIG. 15(b) is a view illustrating the front surface of the drum according to the present invention. FIG. 15(c) is a perspective view of an actuator-connecting wire according to the present invention. FIG. 16 is an exploded perspective view of a wire guide according to the present invention.

Hereinafter, a structure for supplying power to the front balancer and the rear balancer included in the laundry treatment apparatus according to the present invention will be described. The laundry treatment apparatus according to the present invention further includes a power supply 8 for supplying power to the actuator 68 of the balancer 6.

Figure 13:
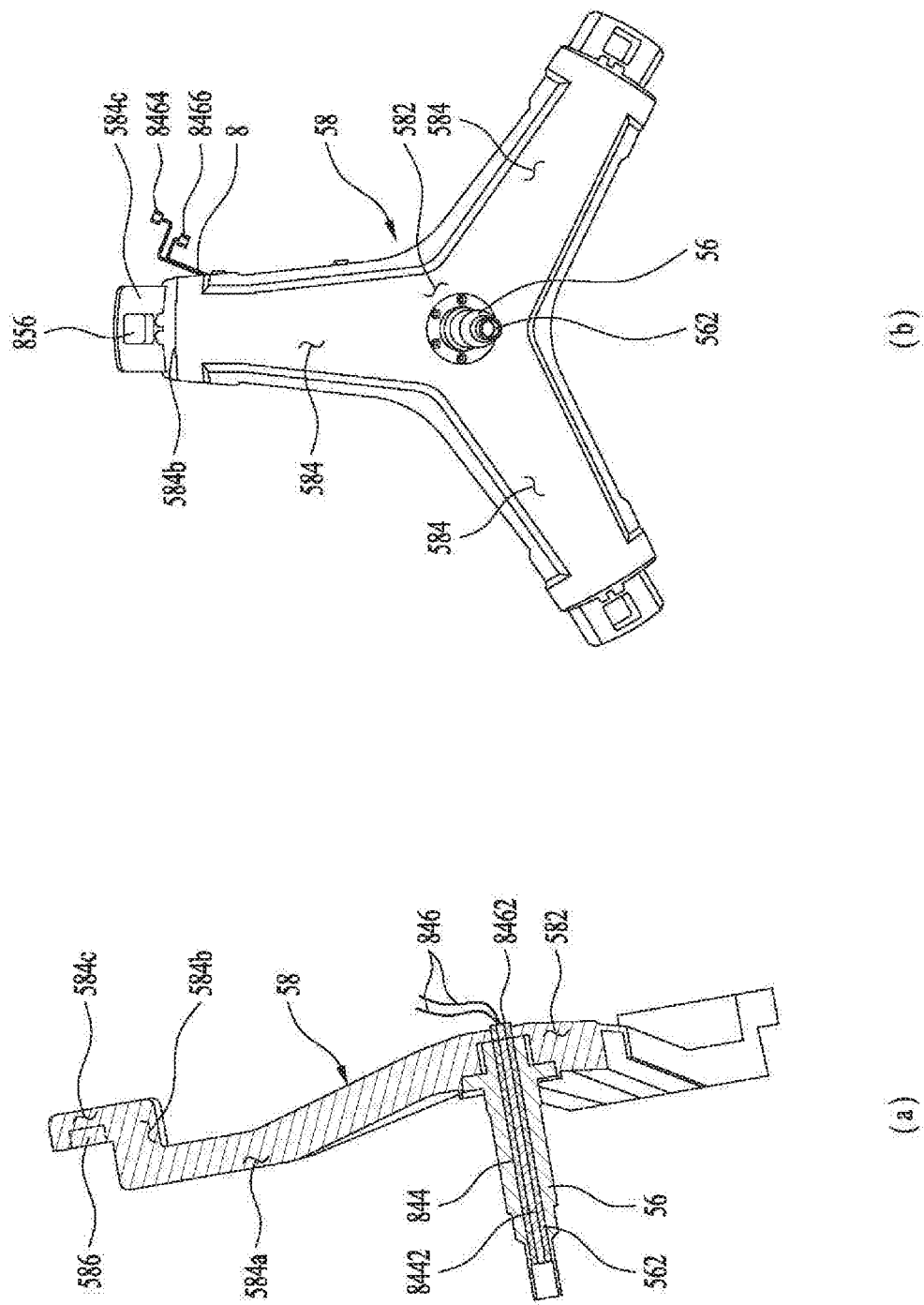
FIG. 13 shows a cross-sectional view of a spider according to the present invention shown on the left with label (a) and a bottom view of the spider according to the present invention shown on the right with label (b)
Figure 14:
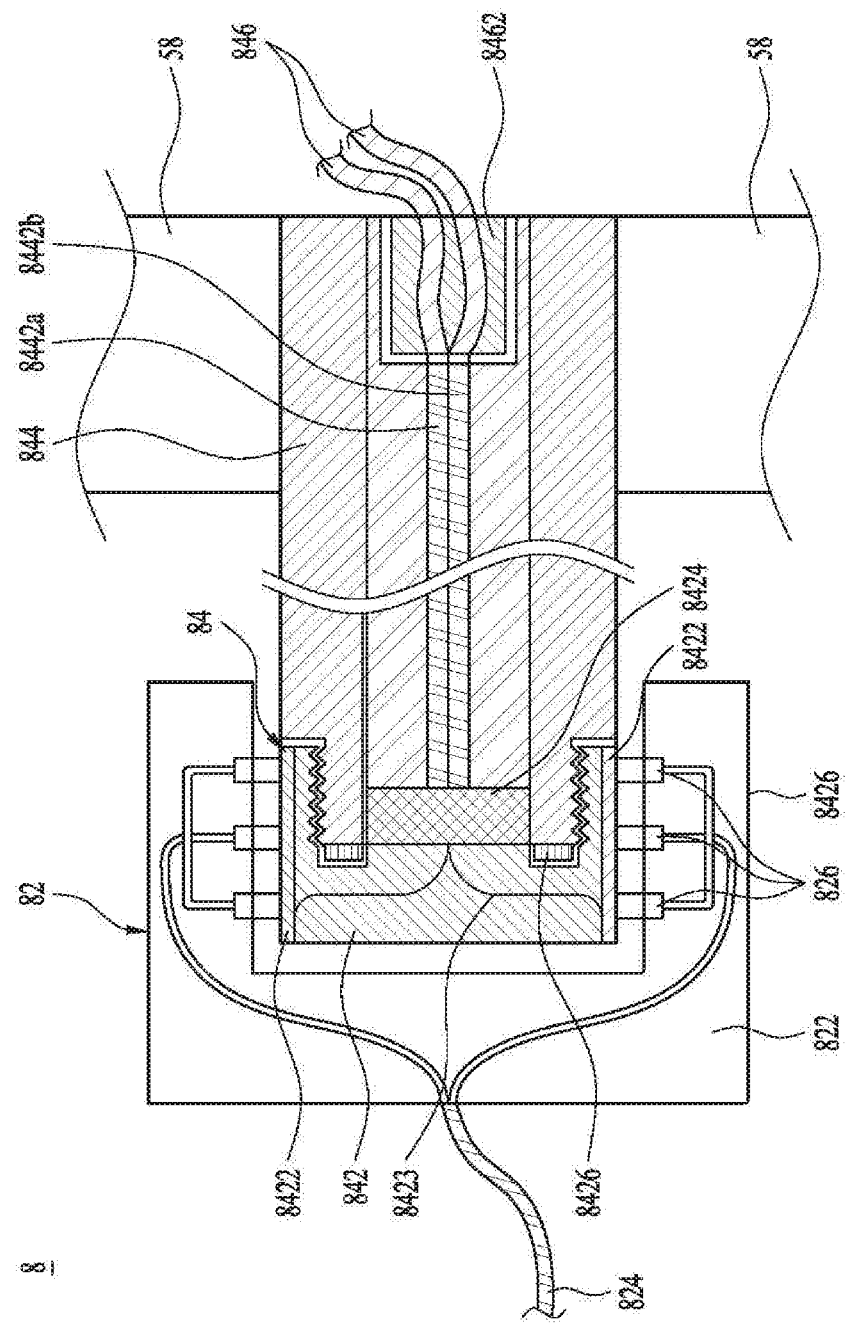
FIG. 14 is an enlarged cross-sectional view of the spider according to the present invention.

As illustrated in FIGS. 13 and 14, the power supply 8 may include a first power supply part or connector 82 connected to an external power source 824 and a second power supply part or connector 84 electrically connected to the first power supply part 82 so as to supply power to the actuator 68. The first power supply part 82 includes a first body 822 secured to the inside of the cabinet 1 and a first contact 826 provided at the first body 822 and including a conductor, and the first contact 826 is connected to the external power source 824 so as to receive power.

The first body 822 may be configured to have a cylindrical form into which the rotating shaft 56 is inserted, and the first contact 826 may project from the inner circumferential surface of the first body 822, and may be elastic. Accordingly, even when the rotating shaft 56 is rotated, the rotating shaft 56 may be maintained in electrical contact with the second contact 8422 provided at the outer circumferential surface of the rotating shaft 56.

The second power supply part 84 includes a second body 842, which is provided at the rotating shaft 56 so as to be integrally rotated with the rotating shaft 56. The second body 842 may include a conductor, and may come into electrical contact with the first contact 826 so as to receive power. More specifically, the second body 842 may be connected to a shaft-connecting wire 8442 provided in the shaft through hole 562 so as to supply power. The second body 842 comes into contact with the first contact 826 at the outer circumferential surface thereof, and a portion of the second body 842 is fitted into the shaft through hole 562 so as to be connected to the shaft-connecting wire 8442.

In another embodiment, the second body 842 may include the second contact 8422 composed of a conductor and provided at the outer circumferential surface of the second body 842 so as to come into electrical contact with the first contact 826, a third contact 8424 fitted into the shaft through hole 562 so as to be connected to the shaft-connecting wire 8442, and a contact-connecting wire 8423 for connecting the second contact 8422 to the third contact 8424. Here, each of the second contact 8422 and the third contact 8424 may include a conductor.

The second body 842 may be configured to have a cylindrical form having a thread formed in the inner circumferential surface thereof so as to be coupled to the end of the rotating shaft 56. The rotating shaft 56 may be provided at the outer circumferential surface thereof with a corresponding thread such that the second body 842 is coupled to the outer circumferential surface of the rotating shaft 56.

The rotating shaft 56 may include a shaft through hole 562 formed therein and a shaft-connecting wire 8442 disposed in the shaft through hole 562. The shaft-connecting wire 8442 is connected to the second body 842 or the third contact as described above so as to receive power and is connected to a first connecting wire, to be described later, so as to supply the power. The first connecting wire 846 is connected to the actuator 68 of the rear balancer 6b so as to supply power. The first connecting wire 846 may be connected to the second connecting wire 866 so as to supply power to the front balancer 6a, and the second connecting wire 866 may be connected to the actuator 68 of the front balancer 6a.

Although the shaft-connecting wire, the first connecting wire and the second connecting wire are illustrated as the only wires for supplying power for the convenience of explanation, the laundry treatment apparatus may further include a first wire (not shown) for supplying power to the rear balancer and a second wire (not shown) for supplying power to the front balancer.

The shaft through hole 562 may be provided therein with a shaft socket 844 in order to prevent leakage of washing water into the shaft through hole 562 and to facilitate coupling of the shaft-connecting wire 8442 to the shaft through hole 562. The shaft socket 844 may be provided therein with the shaft-connecting wire 8442, and opposite ends of the shaft socket 844 may be configured to have a socket form so as to facilitating assembly.

The shaft-connecting wire 8442 may include a front shaft-connecting wire 8442a for supplying power to the front balancer 6a and a rear shaft-connecting wire 8442b for supplying power to the rear balancer 6b. Each of the front shaft-connecting wire 8442a and the rear shaft-connecting wire 8442b may be composed of four electric wires (the electric wire means a conductor through which electric current flows in one direction). The reason for this is because the front balancer 6a and the rear balancer 6b each requires four electric wires since there is a need to provide two electric wires in order to supply current to one motor and one balancer includes two motors.

One end of the first connecting wire 846 is a first of first connecting wire terminal (or first connecting wire terminal) 8462, which is fitted into a socket formed in the end of the shaft socket 844, and the other end of the first connecting wire 846 is composed of a second of first connecting wire terminal (or first balancer connecting wire terminal) 8464 and a third of first connecting wire terminal (or third balancer connecting wire terminal) 8466, which are branched from the first connecting wire 846 toward the rear balancer 6b and the front balancer 6a so as to supply power to the rear balancer 6b and the front balancer 6a.

The first connecting wire 846 is secured to the spider 58. Specifically, the first connecting wire 846 is secured to one side of one of the spider arms 584. As illustrated in FIG. 15(a), the first connecting wire 846 is connected to the actuator 68 so as to supply power. More specifically, the first connecting wire 846 is connected to the power supply socket 6822 provided at the actuator housing 62.

For the convenience of assembly, the apparatus may further include an actuator-connecting wire 848 connecting the second of first connecting wire terminal 8464 provided at the other end of the first connecting wire 846 to the power supply socket 6822 provided at the actuator housing 62. As illustrated in FIG. 15(c), the actuator-connecting wire 848 is composed of a total of four electric wires, two of which are connected to each of the two motors so as to supply power.

As illustrated in FIG. 16, in order to supply power to the front balancer 6a, the apparatus further includes the second connecting wire 866 connecting the first connecting wire 846 to the front balancer 6a. The second connecting wire 866 is connected to the third of first connecting wire terminal 8466 and is in turn connected to the actuator 68 provided at the front balancer 6a. As illustrated in FIG. 15(*b*), the actuator-connecting wire 848 may connect the second connecting wire 866 to the power supply socket 6822 provided at the actuator housing 62 for the convenience of assembly.

Because the second connecting wire 866 is provided at the outer circumferential surface of the drum 4, the second connecting wire 866 may break due to the rotation of the drum 4. To solve this problem, the laundry treatment apparatus according to the present invention may further include a wire guide 86, which is provided at the outer circumferential surface of the drum 4 so as to protect the second connecting wire 866.

The wire guide 86 includes a guide body 862, which is elongated in the length direction of the drum 4 and is secured to the outer circumferential surface of the drum 4, and a fixing rib 864 projecting from the inner surface of the guide body 862. Since the second connecting wire 866 is secured to the fixing rib 864, the second connecting wire 866 should not be exposed.

In order to maximally prevent the second connecting wire 866 from being exposed from the outer circumferential surface of the drum 4, the drum 4 includes the third drum through hole 422 penetrating the drum body 42 and the rear drum surface member 46 (or the front drum surface member 44) and a second connecting wire through hole 6281 provided in the housing-fastening protrusion 628 of the housing 62 so as to communicate with the third drum through hole 422. Consequently, the second connecting wire 866 extends through the third drum through hole 422 and the second connecting wire through hole 6281.

The second connecting wire 866 is connected to the first connecting wire 846 at the rear drum surface member 46, and is connected to the actuator of the front balancer 6a at the front drum surface member 44. The reason for this is to prevent the second connecting wire 866 from being exposed from the outer circumferential surface of the drum body 42 while allowing the second connecting wire 866 to be exposed only through the front surface 44 or the rear surface 46 of the drum 4.

Figure 17:
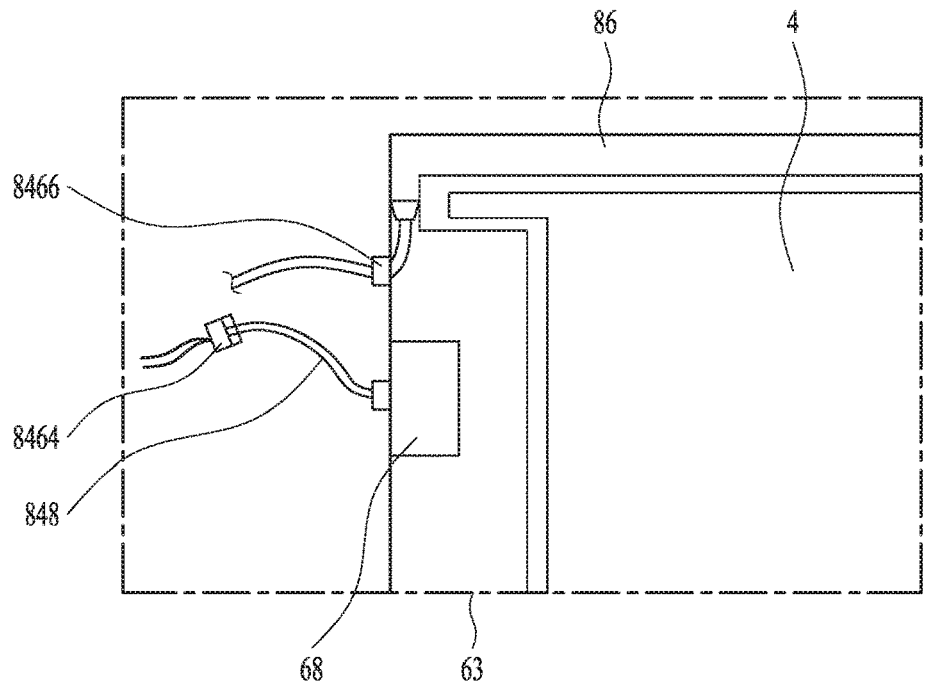
FIG. 17 shows a cross-sectional view of a wire guide according to another embodiment of the present invention shown on top with label (a) and a view illustrating an installation example of the wire guide according to another embodiment of the present invention shown on bottom with label (b).
Figure 17:
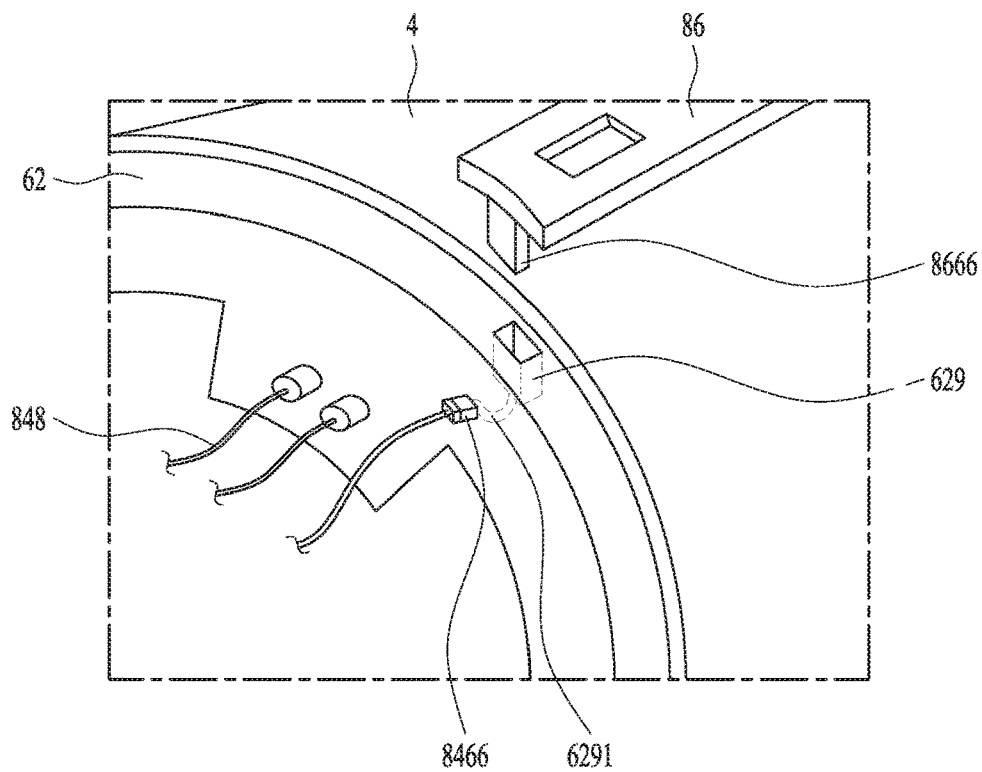

FIG. 17(*a*) is a cross-sectional view of a wire guide according to another embodiment of the present invention. FIG. 17(*b*) is a view illustrating an installation example of the wire guide according to another embodiment of the present invention.

Hereinafter, the wire guide according to another embodiment of the present invention will be described with reference to FIG. 17. As described above, if the second connecting wire 866 is provided at the outer circumferential surface of the drum 4, there is a high risk of the second connecting wire 866 being broken between the rotating drum 4 and the inner circumferential surface of the stationary tub 2.

In order to solve these problems, the laundry treatment apparatus according to another embodiment of the present invention may include the wire guide 86 using no wire, such as an electric wire at the outer circumferential surface of the drum 4. Here, the wire guide 86 includes a guide body 862 composed of a non-conductor and provided at the outer circumferential surface of the drum 4, a conductor (not shown) provided in the guide body 862 so as to allow current to flow therethrough, and a guide terminal 8666 provided at opposite ends of the guide body 862 so as to be electrically connected to the conductor.

The guide terminal 8666 is fitted into a power socket hole 629 formed in the housing 62 of the drum 3 or the balancer. The power socket hole 629 may include a pair of power socket holes formed in opposite ends of the drum 4. The wire guide 86 may be secured to the outer circumferential surface of the drum 4 merely by fitting the guide terminal 8666 into the power socket hole 629.

The power socket hole 629 includes a power socket wire 6291, which comes into electrical contact with the guide terminal 8666 and is connected to the third of first connecting wire terminal. Accordingly, fitting of the guide terminal 8666 into the power socket hole 629 enables the third of first connecting wire terminal, the wire guide and the front balancer to be electrically connected to one another, thereby constituting an electrical circuit.

The present invention may be embodied into various modifications, and the scope of rights thereof is not limited to the above embodiments. Accordingly, as long as modifications thereof include components disclosed in claims, it should be understood that the modifications are considered as falling within the scope of rights of the present invention.

The invention claimed is:

1. A laundry treatment apparatus comprising:
   a cabinet;
   a tub provided in the cabinet;
   a drum rotatably provided in the tub;
   at least one balancer housing secured to the drum;
   a receiving space defined in the at least one balancer housing so as to form a closed loop;
   at least one counter weight provided in the receiving space and configured to move in the receiving space to balance the drum;
   at least one ring connected to the at least one counter weight and configured to move the at least one counter weight; and
   an actuator operably connected to and configured to rotate the at least one ring,
   wherein the at least one counter weight is configured to revolve 360 degrees within the receiving space, and
   wherein the at least one ring includes at least one of a ring guide protrusion or a ring guide groove, and the receiving space includes at least one of a receiving space groove or a receiving space protrusion having a shape corresponding to a shape of the ring guide protrusion or the ring guide groove.

2. The laundry treatment apparatus according to claim 1, wherein the at least one ring is configured to have a circular shape defining a closed loop or an arc shape defining an open loop.

3. The laundry treatment apparatus according to claim 2, wherein the at least one ring has a strength such that a shape of the ring is not deformed by a load of the at least one counter weight.

4. The laundry treatment apparatus according to claim 3, wherein the at least one counter weight includes a first counter weight and a second counter weight, and wherein the at least one ring includes:
   a first ring; and
   a second ring provided below the first ring and having the same diameter as the first ring, and wherein the first counter weight is connected to the first ring and the second counter weight is connected to the second ring.

5. The laundry treatment apparatus according to claim 3, wherein the at least one counter weight includes a first counter weight and a second counter weight, and wherein the at least one ring includes:
a first ring; and
a second ring having a diameter different from that of the first ring, and
wherein the first counter weight is connected to the first ring and the second counter weight is connected to the second ring.

6. The laundry treatment apparatus according to claim 1, wherein the actuator includes:
a motor configured to generate rotational force using a supplied electric power; and
a rotating gear configured to be rotated by the motor, and wherein the ring includes gear teeth formed on a surface thereof, the gear teeth configured to be engaged with the rotating gear so as to rotate the at least one ring.

7. The laundry treatment apparatus according to claim 3, wherein the actuator includes a rotating gear, and the ring is composed of a chain, the chain being engaged with the rotating gear so as to be moved.

8. The laundry treatment apparatus according to claim 7, wherein the at least one counter weight is configured to define an arc extending in a circumferential direction with respect to a central axis of the drum.

9. The laundry treatment apparatus according to claim 8, wherein the at least one counter weight is connected to an outer circumferential surface of the ring.

10. The laundry treatment apparatus according to claim 9, wherein the at least one counter weight is configured to contact a surface of the receiving space, and is held to the surface of the receiving space when a rotational speed of the drum is equal to or higher than a predetermined speed.

11. The laundry treatment apparatus according to claim 10, further including rollers provided at opposite ends of the at least one counter weight so as to enable the at least one counter weight to be smoothly moved in the receiving space.

12. The laundry treatment apparatus according to claim 11, further including a spacer provided at the at least one counter weight or an inner side surface of the receiving space so as to space the at least one counter weight apart from a surface of the receiving space.

13. The laundry treatment apparatus according to claim 12, further including:
a magnetic body provided at the at least one counter weight; and
a sensor provided at the tub or the cabinet so as to detect magnetism of the magnetic body.

14. The laundry treatment apparatus according to claim 13, wherein the at least one balancer housing includes a first circumferential surface and a second circumferential surface, and the actuator comes into contact with the second circumferential surface.

15. The laundry treatment apparatus according to claim 13, wherein the at least one balancer housing includes a recess which is depressed toward a rotational axis of the drum from the receiving space, and the actuator is mounted in the recess.

16. The laundry treatment apparatus according to claim 13, wherein the at least one balancer housing includes a balancer housing opening, which is open toward a rotational axis of the drum, and the actuator is coupled to the balancer housing opening.

17. The laundry treatment apparatus according to claim 6, wherein teeth of the rotating gear project into the receiving space.

18. The laundry treatment apparatus according to claim 6, wherein the gear teeth are provided at an inner circumferential surface of the ring.

19. The laundry treatment apparatus according to claim 5, further including:
a first motor and a first rotating gear, which transmit rotational force to the first ring; and
a second motor and a second rotating gear, which transmit rotational force to the second ring.

20. The laundry treatment apparatus according to claim 19, wherein the first rotating gear and the second rotating gear rotate on different planes from each other.

21. The laundry treatment apparatus according to claim 19, further including an equilibrium weight for preventing eccentricity of the drum caused by load of the actuator.

22. The laundry treatment apparatus according to claim 21, wherein the equilibrium weight is provided at a point on the at least one balancer housing that is opposite the actuator.

23. The laundry treatment apparatus according to claim 22, further including a power supply to supply power to the actuator.

24. The laundry treatment apparatus according to claim 23, wherein the power supply includes:
a rotating shaft that rotates the drum;
a shaft through hole provided in the rotating shaft; and
a shaft-connecting wire connected to an outside through the shaft through hole and connected to the actuator so as to supply power to the actuator.

25. The laundry treatment apparatus according to claim 24, further including a shaft socket, which includes the shaft-connecting wire and which comes into electrical contact with the shaft-connecting wire at opposite ends thereof, the shaft socket being provided in the shaft through hole.

26. The laundry treatment apparatus according to claim 24, wherein the power supply further includes:
a first body connected to a power source; and
a second body secured to the rotating shaft so as to come into electrical contact with the shaft-connecting wire and the first body.

* * * * *